United States Patent
Amico

(10) Patent No.: US 11,256,827 B2
(45) Date of Patent: *Feb. 22, 2022

(54) DATA PRIVACY AND SECURITY IN VEHICLES

(71) Applicant: PRIVACY4CARS, Inc., Kennesaw, GA (US)

(72) Inventor: Andrea Amico, Marietta, GA (US)

(73) Assignee: Privacy4Cars, Inc., Kennesaw, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/499,997

(22) Filed: Oct. 13, 2021

(65) Prior Publication Data

US 2022/0027509 A1 Jan. 27, 2022

Related U.S. Application Data

(63) Continuation of application No. 16/279,389, filed on Feb. 19, 2019, now Pat. No. 11,157,648.

(60) Provisional application No. 62/632,707, filed on Feb. 20, 2018.

(51) Int. Cl.
  *G06F 21/62* (2013.01)
  *H04W 12/02* (2009.01)
  *G06F 16/245* (2019.01)

(52) U.S. Cl.
  CPC ........ *G06F 21/6245* (2013.01); *G06F 16/245* (2019.01); *H04W 12/02* (2013.01); *G06F 2221/2143* (2013.01)

(58) Field of Classification Search
  CPC ........ G06F 21/6245; G06F 2221/2143; H04W 12/02; H04W 12/03
  See application file for complete search history.

(56) References Cited

U.S. PATENT DOCUMENTS

| | | | |
|---|---|---|---|
| 9,609,025 | B1 | 3/2017 | Betzler |
| 2004/0025053 | A1 | 2/2004 | Hayward |
| 2005/0196016 | A1 | 9/2005 | Sato |
| 2010/0211770 | A1 | 8/2010 | Alrabady |
| 2013/0060820 | A1 | 3/2013 | Bulusu |
| 2014/0101784 | A1 | 4/2014 | Shukla |
| 2014/0240089 | A1* | 8/2014 | Chang ............ G06Q 20/3223 340/5.61 |
| 2015/0039738 | A1 | 2/2015 | Subramani |
| 2016/0059864 | A1 | 3/2016 | Feit |
| 2016/0253348 | A1 | 9/2016 | Mau ti, Jr. |
| 2017/0046533 | A1 | 2/2017 | Retter |
| 2017/0132157 | A1 | 5/2017 | Makke |
| 2020/0098049 | A1 | 3/2020 | Jack |

\* cited by examiner

*Primary Examiner* — Robert B Leung
(74) *Attorney, Agent, or Firm* — King & Spalding

(57) ABSTRACT

A system includes a server that is communicatively coupled to a computing device. The server receives vehicle information associated with a target vehicle that has a target in-vehicle module from which a privacy information of a user is to be removed. Using the vehicle information, the server retrieves and transmits data associated with removing privacy information from a set of candidate in-vehicle modules of vehicles that are related to the target vehicle. The computing device presents an instruction set associated with removing privacy information from the candidate in-vehicle module that corresponds to the selected image. The server receives user feedback associated with the instruction set.

20 Claims, 13 Drawing Sheets

DATA PRIVACY AND SECURITY IN VEHICLES

CROSS REFERENCE TO RELATED APPLICATIONS

This application is a continuation of and claims priority to U.S. application Ser. No. 16/279,389 titled "Data Privacy and Security in Vehicles," and filed on Feb. 19, 2019, which claims benefit of U.S. Provisional Application No. 62/632,707 titled "Data Privacy and Security in Vehicles," and filed on Feb. 20, 2018, the entire contents of which are incorporated herein by reference.

TECHNICAL FIELD

Embodiments of the present disclosure relate generally to information security, and more particularly to data privacy and security in vehicles.

BACKGROUND

Modern vehicles include advanced in-vehicle systems, such as, infotainment, digital, and/or electronic systems, that can store personally identifiable information of an owner or a user. For example, a garage door opener of the owner or the user of a vehicle may be paired with a garage door system of the vehicle. The vehicle may store and retain data associated with opening the garage of the owner or the user (hereinafter both the owner and the user may be referred to as a 'user') for convenience and future use. In another example, an infotainment system of the vehicle, e.g., infotainment systems with Bluetooth pairing and/or navigation capability may store personal addresses, user contacts, phone numbers, financial information, points of interests, navigation data, home address, and/or other personal information associated with the users of the vehicle. Further, with several Internet connected vehicles, vehicles come equipped with telematics units and may offer companion mobile apps, which allow mobile users a number of advanced functions, such as locating and tracking the vehicle, locking and unlocking doors, remotely start or stop the engine, etc. In addition, in the future vehicles may monitor and record various other personal data of the user such as eye movements, pulse, unique voice signatures, video and audio inside and outside the vehicle, etc.

Due to the sensitive nature of this information, the user may desire to erase the information before the car is handed over to the next user/buyer, such as, when a user sells his car, or a user returns a rental car to prevent unauthorized access of the sensitive information. However, the sequence of steps required to erase such sensitive information of the user from the vehicle may not be readily available to the user. Typically, the sequence of steps required to erase the sensitive information of the user from the vehicle are included in the owner's manual that is associated with the vehicle. However, said sequence of steps may be spread over hundreds of pages and over multiple sections within the owner's manual. Finding the required steps from the hundreds of pages and multiple sections may be time intensive and inconvenient to the user. Further, the required steps that are included in the owner's manual may not be intuitive and easy to follow. Occasionally, the steps indicated in the manual may not be fully accurate or may be entirely missing. Vehicles may not have a user manual available in the vehicle, as is not uncommon with used vehicles and is customary with rental vehicles. In some cases, the user may not even remember or realize that such sensitive information of the user is stored in the vehicle. Furthermore, since there is a huge range of vehicle makes and models in the market, the sequence of steps required to erase the sensitive data is different for each make, model, model year, and trim/infotainment package. Additionally, the makes and models of the vehicles are constantly changing, e.g., new ones get added and old ones get updated all the time. Therefore, it may be very difficult and impractical for the dealers and car rental companies to provide steps required for erasing the instructions to the users (or employees) for all make and models; and to keep up with the different changes in the makes, models, trims, etc., of the vehicles.

Therefore, there exists a need for a technical solution to the technical problem of lack of information security (cybersecurity), lack of protection of consumers' privacy and personal information from unauthorized access, and increased information safety risks in vehicles. There exists a need for technology that allows sensitive or personal information of users to be erased from vehicles to mitigate the risks associated with the breach of privacy information of the users.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure may be related to a vehicle data privacy system that includes a privacy information removal server. The privacy information removal server is communicatively coupled to a computing device that comprises a privacy information removal application installed thereon. The privacy information removal application may be associated with the privacy information removal server. The privacy information removal server is configured to receive, from the computing device, vehicle information associated with a target vehicle comprising a target in-vehicle device from which privacy information associated with a user is to be removed. Further, the privacy information removal server is configured to determine, by a make and model identification engine of the privacy information removal server, vehicle parameters associated with the target vehicle based on the vehicle information associated with the target vehicle. Then, the privacy information removal server is configured to create, by the privacy information removal steps engine of the privacy information removal server, a privacy information removal file. The privacy information removal file comprises data associated with a set of candidate in-vehicle devices. The privacy information file is created based on one or more of the vehicle parameters of the target vehicle. The set of candidate in-vehicle devices includes one or more candidate in-vehicle devices of vehicles that are related to the target vehicle. The data associated with the set of candidate in-vehicle devices includes instruction sets associated with removing privacy information from each candidate in-vehicle device of the set of candidate in-vehicle devices. The privacy information removal server is configured to transmit the privacy information removal file to the computing device. Responsively, the privacy information removal server is configured to receive and record, by a user experience engine of the privacy information removal server, a user experience feedback associated with the set of candidate in-vehicle devices.

In another aspect, the present disclosure may be related to a computer readable medium stored in a computing device that is communicatively coupled to a privacy information removal server. The computer readable medium includes computer executable commands which when executed by the computing device causes the computing device to perform a method. The method includes receiving vehicle information associated with a target vehicle comprising a target in-vehicle device from which privacy information associated with a user is to be removed. Further, the method includes transmitting the vehicle information associated with the target vehicle to the privacy information removal server. Then, the method includes receiving, from the privacy information removal server, a privacy information removal file based on the vehicle information associated with the target vehicle. The privacy information removal file includes data associated with a set of candidate in-vehicle devices. The set of candidate in-vehicle devices comprising in-vehicle devices of vehicles that are related to the target vehicle. The data associated with the set of candidate in-vehicle devices comprises images of each candidate in-vehicle devices of the set of candidate in-vehicles devices and instruction sets associated with removing privacy information from each candidate in-vehicle device of the set of candidate in-vehicle devices. The data associated with the set of candidate in-vehicle devices are arranged in a likely order of resemblance of each candidate in-vehicle device of the set of candidate in-vehicle devices with respect to the target in-vehicle device of the target vehicle. The likely order of resemblance is determined based on the one or more of the vehicle parameters of the vehicle. The method further includes presenting the images of each candidate in-vehicle device of the set of candidate in-vehicle devices in the likely order of resemblance. Furthermore, the method includes responsively, presenting an instruction set associated with removing privacy information from the candidate in-vehicle device that corresponds to an image that is selected by the user. Then, the method includes requesting the user to provide a feedback regarding at least one of: whether at least one of the images of the candidate in-vehicle devices matched the target in-vehicle device of the target vehicle and whether the user was able to successfully remove the privacy information of the user from the target in-vehicle device of the target vehicle by following an instruction set associated with one of the one or more candidate in-vehicle devices.

In yet another aspect, the present disclosure relates to a privacy information removal system that includes a privacy information removal server. The privacy information removal server is communicatively coupled to a plurality of external data sources and a computing device that comprises a privacy information removal application installed thereon. The privacy information removal server is configured to build a privacy information removal database comprising a plurality of instruction sets associated removing privacy information from in-vehicle modules of a plurality of vehicles of various makes, models, and model years. The privacy information removal database is built using information received from the plurality of external data sources. Further, the privacy information removal server is configured to receive, from the computing device, vehicle information associated with a target vehicle comprising a target in-vehicle module from which privacy information of a user is to be removed. Then, the privacy information removal server is configured to determine vehicle parameters associated with the target vehicle based on the vehicle information. Furthermore, the privacy information removal server is configured to query the privacy information removal database to retrieve an instruction set associated with removing privacy information from the target in-vehicle device of the target vehicle. The privacy information removal server is configured to transmit the instruction set to the computing device and receive, from the computing device, a user inputted feedback regarding whether the user was able to successfully remove the privacy information of the user from the target in-vehicle device of the target vehicle by following an instruction set. Finally, the privacy information removal server can generate reports on the removal of the privacy information, reports that can be used for a number of internal uses (e.g. to improve the instruction sets, to improve the generation of the likely order of resemblance of each candidate in-vehicle device of the set of candidate in-vehicle devices with respect to the target in-vehicle device of the target vehicle, etc.) or external uses (e.g. to provide proof of work of the privacy information deletions for compliance, to measure and improve the efficiency of the privacy information deletion, etc.).

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
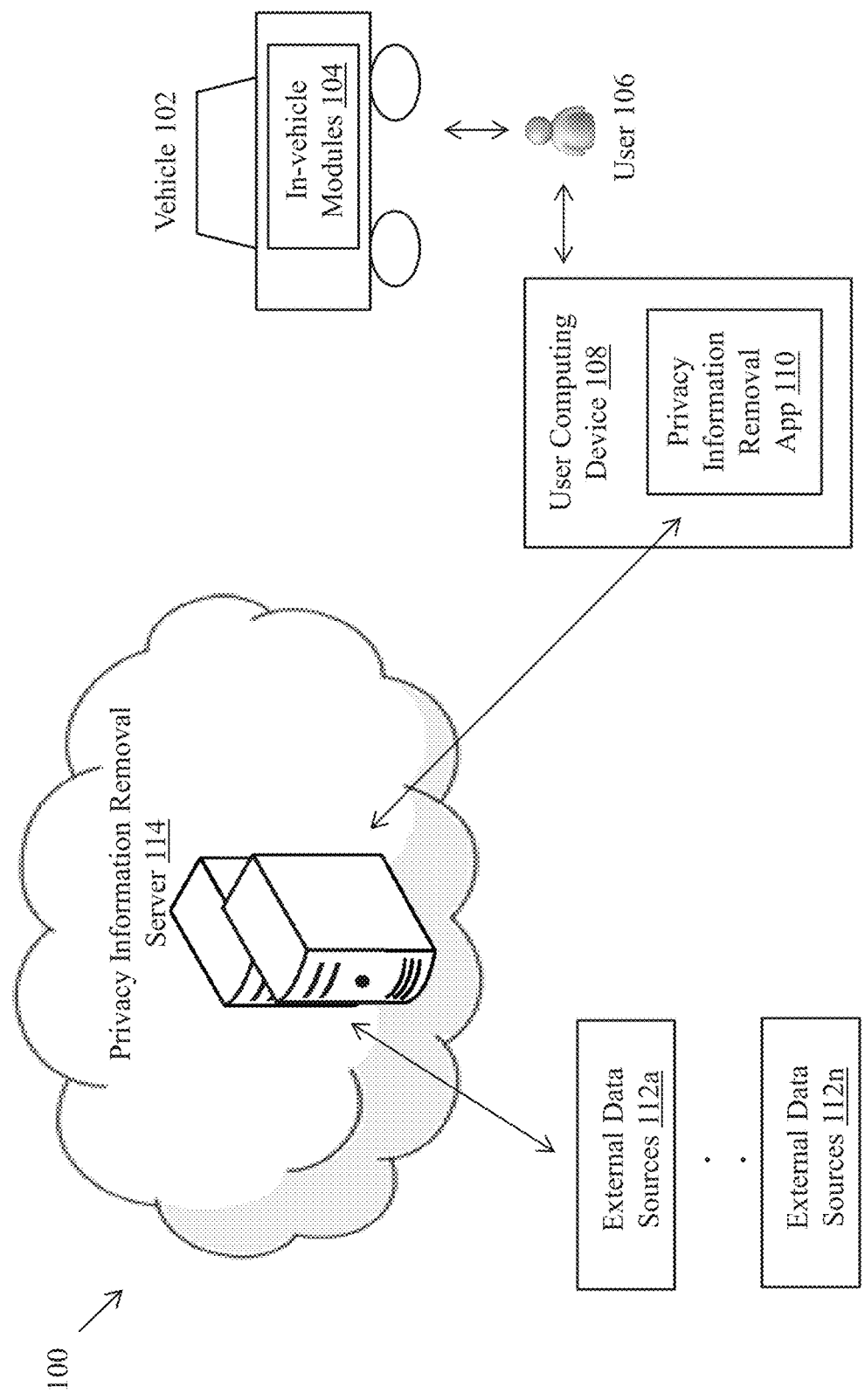
FIG. 1 illustrates an example system architecture of data security and privacy in vehicles, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a privacy information removal system and method that provides a technical solution to a technical problem of information security and privacy data protection in vehicles, and particularly preventing unauthorized access of privacy data stored in in-vehicle modules of vehicles such as, infotainment modules, Bluetooth modules, garage door opener modules, telematics package, aftermarket telematics and GPS, etc. Further, the privacy information removal system and method of the present disclosure is configured to provide a practical application that allows a user to easily and consistently erase sensitive and personal information of the user from any appropriate in-vehicle module of any appropriate vehicle by resetting the in-vehicle module of the vehicle that stores sensitive and personal information of the user, thereby protecting consumers' privacy and personal information stored in vehicles. In particular, the privacy information removal system and method of the present disclosure provides a single comprehensive and integrated platform where information needed to reset any appropriate in-vehicle modules of any appropriate vehicle can be obtained via a user-friendly search and said information is presented with easy to follow visual instructions and/or visual cues/indicators (or auditory, tactile, etc.). In some example embodiments, said information may be presented as voice instructions.

An example aspect of the privacy information removal system and method includes a backend server with a database that includes data associated with erasing sensitive and personal information (herein 'privacy information') of a user from various in-vehicle modules of vehicles of various makes, models, years, and/or trims. The database may be built by collecting data associated with erasing the privacy information from in-vehicle modules of various vehicle from multiple external data sources, such as, but not limited to, owner's manuals of the vehicles, infotainment-specific manuals, manufacturer websites and data stores, third party websites that provide vehicle information, video sharing websites, in-person inspections of vehicles, tier 1/2/3/suppliers to the OEMs, etc. The data that is collected from the multiple external data sources is processed and/or restructured/transformed by the backend server into concise instruction sets. In one embodiment, each instruction of each instruction set may have a corresponding image and/or a visual indicator (e.g., call outs), i.e., the concise instruction sets may include text instructions along with the images corresponding to the text instructions with or without indicators (visual, auditory, etc.) overlaid on or associated with the images. In some examples, the instruction sets may not include the images. Instead, the instruction sets may include the text instructions, indicators, and the data regarding where the indicators must be positioned on an image of the in-vehicle module (e.g., augmented reality—when instructions are presented on a live feed of the in-vehicle module). The indicators may be used to indicate a sequence of the instructions and a portion of the in-vehicle module (e.g., button, touch screen, knob, etc.) that a user should interact with to complete the instruction. The concise instruction sets for erasing the privacy information of a user from various in-vehicle modules of various makes, models, and/or trims of vehicles may be stored in the database.

Further, the privacy information removal system and method includes a front-end application that is available at a computing device of the user. The front-end application allows the user to provide an input comprising information associated with the vehicle (also interchangeably referred to as 'target vehicle') that includes the in-vehicle module (also interchangeably referred to as 'target in-vehicle module') from which a privacy information of a user is to be removed. Example information associated with the vehicle may include, but is not limited to, information that identifies the make, model, and/or trim of the vehicle. In one example, the input may include a vehicle identification number (VIN), a bar code or QR code representative of the VIN number, images of the dashboard, images of the infotainment system, live feed of the infotainment system as received by an image capture unit/device of the computing device, or other features of the vehicle that may be used to identify the specific in-vehicle module that may contain (or have stored therein) personal information that a user wishes to erase. In another example, the input may include the make, model, and trim of the vehicle that is selected by the user from a drop-down menu provided by the front-end application.

In either case, the input is transmitted to the backend server that processes the input to determine vehicle parameters associated with the vehicle, and thereby identify the vehicle. The vehicle parameters may include, but are not limited to, make, model, year, and/or trim of the vehicle. Based on the identified vehicle, i.e., the make, model, year, and/or trim of the vehicle, the backend server queries the database for and retrieves data associated with erasing the privacy information of the user from a set of in-vehicle modules (also interchangeably referred to as 'candidate in-vehicle modules'). The set of in-vehicle modules may include the target in-vehicle module, an in-vehicle module of a vehicle matching the identified make, model, year, and/or trim of the target vehicle; and/or in-vehicle modules of other vehicles that most-likely match or are related to the identified make, model, year, and/or trim of the target vehicle. In other words, the backend server retrieves instruction sets associated with erasing the privacy information from all in-vehicle modules that resemble the in-vehicle module of the vehicle of the identified make, model, year, and/or trim. In some examples, the backend server may be configured to retrieve data associated with erasing the privacy information of the user from in-vehicle modules of other vehicles that most-likely match or are related to the vehicle of the identified make, model, year, and/or trim only if the data associated with erasing the privacy information of the user from the target in-vehicle module of the target vehicle is unavailable in the database. The data associated with erasing the privacy information of the user from a set of in-vehicle modules may include the instruction sets that comprise the textual instructions, images of the in-vehicle modules, indicators, etc.

Further, the backend server may arrange the data associated with erasing the privacy information of the user from a set of candidate in-vehicle modules based on a likely order of resemblance of the candidate in-vehicle modules with the target in-vehicle module. The backend server may determine the likely order of resemblance based on one or more of the vehicle parameters of the target vehicle such as, but not limited to, the make, the model, the year, the trim, etc. For example, a candidate in-vehicle module of a vehicle that matches the make, model, year, and/or trim of the target vehicle may be arranged first in the likely order of resemblance (e.g., one that most resembles the target in-vehicle module of the target vehicle). Then, candidate in-vehicle modules of vehicles having the same make and model as the target vehicle, but a different year may be positioned as second in the likely order of resemblance (e.g., next most likely one to resemble the in-vehicle module of the vehicle), followed by in-vehicle modules of vehicles having the same make and model year of the target vehicle, but different model, and so on. The example likely order of resemblance of the in-vehicle modules described above is not limiting, and one of skill in the art can understand and appreciate that in other example embodiments, the likely order or resemblance may follow a different order based on a different criterion without departing from a broader scope of the present disclosure.

Further, in some example embodiments, the backend server may determine the likely order of resemblance based on one or more of the vehicle parameter and/or other additional factors such as, but not limited to, user rating of the instruction set associated with the in-vehicle module of the vehicle, historical heuristics, version or body type of in-vehicle module, geography or location of vehicle, version and make of the in-vehicle module, etc.

In either case, the backend server transmits the data associated with erasing the privacy information of the user from the set of candidate in-vehicle modules to the computing device on which the front-end application is installed. Then, the front-end application presents, via the computing device, a series of images of the set of candidate in-vehicle modules based on the likely order of resemblance. In other words, the front-end application presents a series of images of candidate in-vehicle modules that exactly match and/or most-likely match the target in-vehicle module installed in the target vehicle from which the user desires to erase privacy information. Once the user selects one of the presented images of the candidate in-vehicle modules, detailed step by step instructions are displayed with or without images of the candidate in-vehicle module and/or indicators overlaid thereon so the user can confidently erase the privacy information. The user can follow the instructions associated with the selected candidate in-vehicle module (e.g., candidate in-vehicle module that bears closest resemblance to or exactly matches the target in-vehicle) to erase the privacy information from the target in-vehicle modules of the target vehicle.

Further, the front-end application may prompt the user to provide feedback on the quality of the experience, for example: (a) whether the displayed images of the candidate in-vehicle modules matched the actual target in-vehicle module of the vehicle, (b) whether the user was able to successfully erase the privacy information from the various target in-vehicle modules using the instruction set, and/or (c) whether the user's target in-vehicle module was included as part of the available instruction set(s). If the displayed images do not match the actual target in-vehicle module of the target vehicle and/or the user was not able to successfully erase the privacy information by following the instruction set, the front-end application further allows the user to provide comments and/or may provide the user with alternate instruction sets. The feedback and comments provided by the user are transmitted to the backend server to be logged for further analysis and/or reworking of the existing instruction sets. Furthermore, the front-end application may prompt the user to rate privacy information protection features and design of the specific make, model, year, and/or trim of the vehicle which can then be used by other users to determine a data security and privacy standard of vehicles of the same make, model, or trim, for example, when the other users are planning to sell a vehicle.

Before discussing the example embodiments directed to the privacy information removal system and method, it may assist the reader to understand the various terms used herein by way of a general description of the terms in the following paragraphs.

The term 'privacy information' as used herein may generally refer to any information stored in a vehicle that a user does not want an unauthorized party to access. Privacy information may include, personal or user specific information corresponding to the user that is stored in an in-vehicle module, such as, Bluetooth module, navigation module, garage door opener module, toll road pass module, etc. For example, the privacy information may include the home and/or business address for the user and a contact list of individual names, addresses, phone numbers, passwords, etc. Privacy information may further include navigational data, such as locations that the user drives to and from (e.g., a home or business or other points of interest). Privacy information may also include financial information, such as a bank account number or credit card number, corresponding to the user of the vehicle. An appropriate in-vehicle module may utilize this financial information to pay fees (e.g., toll fees) associated with the operation of the vehicle or to make other payments.

The term 'in-vehicle module' may generally refer to any appropriate device of a vehicle that is integrated with or coupled to the vehicle and can store privacy information of a user therein. For example, the in-vehicle module may include garage door opening system of a vehicle, a telematics device, infotainment system, toll pass device, etc. The in-vehicle module may be interchangeably referred to as an in-vehicle device or in-vehicle unit without departing from a broader scope of the present disclosure.

The term 'likely order of resemblance' as used herein in the context of a likely order of resemblance of candidate in-vehicle modules with a target in-vehicle module may generally refer an order or ranking that identifies candidate in-vehicle modules that exactly and/or likely match a target in-vehicle module in any appropriate characteristics of the target in-vehicle module and/or the target vehicle associated with the target in-vehicle module. That is, the likely order of resemblance may indicate how closely a candidate in-vehicle module resembles the target in-vehicle module with respect to any appropriate characteristics of the target in-vehicle module and/or the target vehicle associated with the target in-vehicle module. For example, out of ten parameters, a candidate in-vehicle module that matches the target in-vehicle module in most parameters associated with the characteristics of the target in-vehicle module, such as version, manufacturer, looks, vehicle type in which it is installed, etc., may be listed highest in the order. The likely order of resemblance may be determined using an algorithm that factors in one or more vehicle parameters of a target vehicle that is associated with the target in-vehicle module (e.g., make, model, year, trim, body type, OEM group, geography, etc.) and/or one or more characteristics of the target in-vehicle module (e.g., manufacturer, hardware and software version, etc.)

Referring to FIG. 1, the privacy information removal system 100 may include a vehicle 102 having one or more in-vehicle modules 104 that may store privacy information of a user 106 when the user 106 uses the in-vehicle modules 104 for various operations, such as, making phone calls, getting navigation information, opening garage doors, etc. The vehicle 102 may include, but is not limited to, one of a number of different types of automobiles or motor vehicle, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD), hybrid vehicles, electric vehicles, motorcycles, etc. Further, the user 106 may include either a private owner of the vehicle, other users who are related to and are authorized by the private owner to drive the vehicle (e.g., spouse, kids, friends, etc.), an individual who leases or rents the vehicle from a dealership or a rental agency, an employee of the dealership or rental agency, or a third party service provider, such as an inspector, a claim adjustor, or a mechanic shop operator. In some example embodiments, the user 106 may be an entity, such as a rental agency, dealership, etc.

Further, the privacy information removal system 100 may include a user computing device 108 that is associated with the user 108. The user computing device 108 may be a portable computing device having display, user interaction, and/or network communication capabilities (e.g., Internet connectivity), such as, a mobile phone, a laptop, a tablet, a smart phone, any other appropriate hand-held device, etc. In some example embodiments, the user computing device 108 may also include a desktop or a computing system in-built in the vehicle that has a display, user interaction, and/or network communication capabilities. In said some example embodiments, the user computing device 108 may be disposed in and/or integrated with the vehicle.

As illustrated in FIG. 1, the user computing device 108 may include a privacy information removal application 110 (e.g., front end application) that the user 106 can use to receive instruction sets associated with erasing the privacy information of the user 106 that is stored in in-vehicle modules 104 of the vehicle 102 by resetting the in-vehicle modules 104. In one example embodiment, the privacy information removal application 110 may be a stand-alone mobile application that the user 106 can download to the user computing device 108. In another example embodiment, the privacy information removal application 110 may be a software development kit (SDK) that may be embedded into an internal or external (third party) program code or application. For example, the privacy information removal application 110 may be embedded within an application of a rental agency. In yet another example embodiment, the features of the privacy information removal application 110 may be offered as a service via webservers and/or Application Programming Interfaces (APIs).

In particular, the privacy information removal application 110 may prompt the user 106 via the user computing device 108 to provide an input that identifies the vehicle 102 from which privacy information is to be removed. Responsive to receiving the input, the privacy information removal application 110 transmits the input to a privacy information removal server 114 via a network interface and radio assembly of the user computing device 108. The privacy information removal server 114 processes the input to determine vehicle parameters associated with the vehicle 102, e.g., the make, model, and/or trim of the vehicle. Further, based on the vehicle parameters (e.g., make, model, year, and/or trim), the privacy information removal server 114 queries a privacy information removal guide and images database 224 (shown in FIG. 2) (hereinafter 'privacy information removal database 224' or 'privacy database 224') to retrieve data associated with erasing the privacy information from a set of in-vehicle modules, where the set of in-vehicle modules include the in-vehicle module 104 of the vehicle 102 matching the identified make, model, year, and/or trim; and/or in-vehicle modules of other vehicles that most-likely match or are related to the vehicle 102 of the identified make, model, year, and/or trim.

The privacy information removal database 224 may be built by collecting data associated with erasing the privacy information in a vehicle from multiple external data sources 112*a-n*, such as, owner's manuals of the vehicles, infotainment-specific manuals, manufacturer websites and data stores, third party websites that provide vehicle information, video sharing websites, etc.

Once the data is retrieved, the privacy information removal server 114 transmits the data to the user computing device 108 which displays the images of the set of in-vehicle modules in a likely order of resemblance of each in-vehicle module of the set of in-vehicle modules with the in-vehicle module 104 of the vehicle 102. The user 106 may select an image of one of the in-vehicle modules of set of in-vehicle modules that either exactly matches the in-vehicle module 104 of the vehicle 102 or most closely resembles the in-vehicle module 104 of the vehicle 102. Responsively, the computing device 108 may present an instruction set associated with erasing the privacy information of the user 106 from the selected in-vehicle module. The user 106 may use the instruction set to erase the privacy information of the user 106 from the in-vehicle module 104 of the vehicle 102. Further, the privacy information removal application 110 prompts the user 106 to provide feedback on whether the user 106 was able to follow the instruction set and successfully erase the privacy information from the vehicle 102. If the user 106 was unable to successfully erase the privacy information from the vehicle 102 or if the images of none of the in-vehicle modules in the set of in-vehicle modules matched the actual in-vehicle module 104 of the vehicle 102, then, the privacy information removal application 110 may further prompt the user 106 to provide additional feedback and comments. Responsively, the feedback and comments provided by the user 106 may be transmitted to the privacy information removal server 114 where they are stored for further analysis, reworking of the instruction set, and/or to provide alternate instruction set. Furthermore, the privacy information removal application 110 may prompt the user 106 to rate the privacy information protection features and design of the specific make, model, and/or trim of the vehicle. The rating will be stored in a user experience database 226 (shown in FIG. 2) by the privacy information removal server 114. Additionally, the privacy information removal server 114 handles user registration, billing, instruction set usage tracking, user experience, etc.

In one example, the privacy information removal server 114 may be hosted on a cloud platform. However, in other examples, the privacy information removal server 114 may be hosted on a software as a service (SaaS) platform, or on a dedicated server in a data center without departing from a broader scope of the present disclosure.

Figure 2:
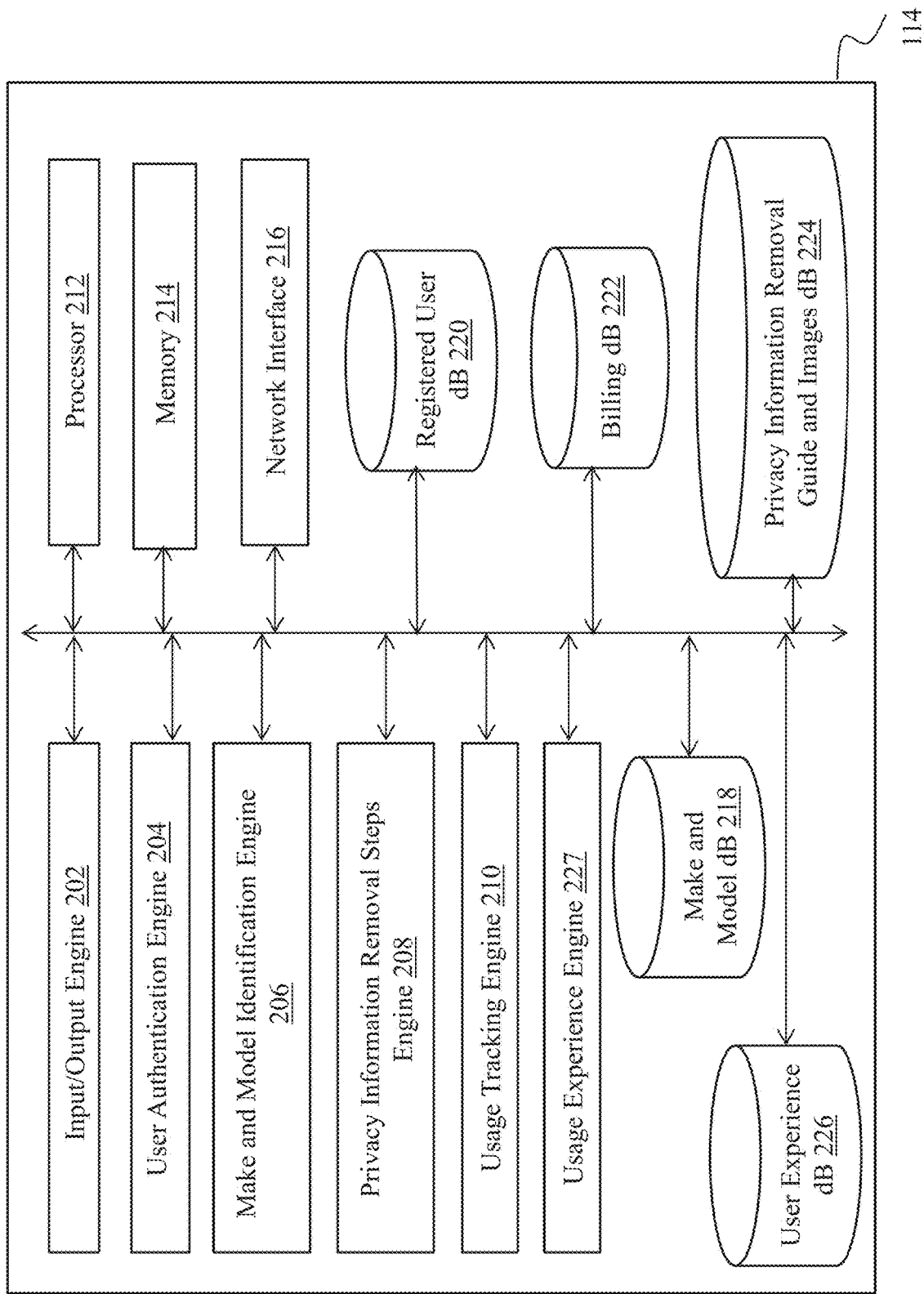
FIG. 2 illustrates an example block diagram of the privacy data removal engine, in accordance with example embodiments of the present disclosure.
Figure 3:
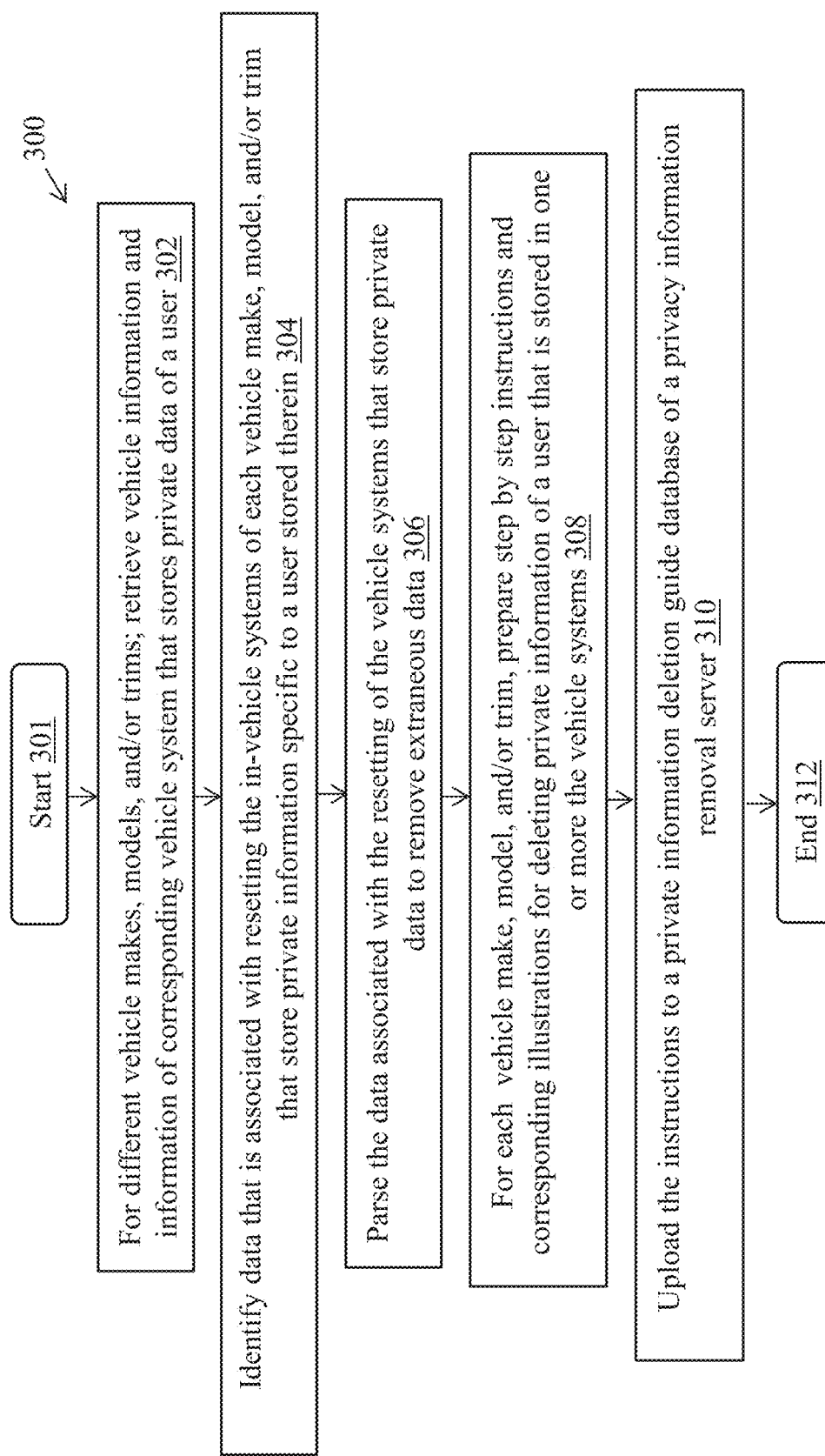
FIG. 3 is a flowchart that illustrates an example method of building the privacy data removal database, in accordance with example embodiments of the present disclosure.
Figure 4A:
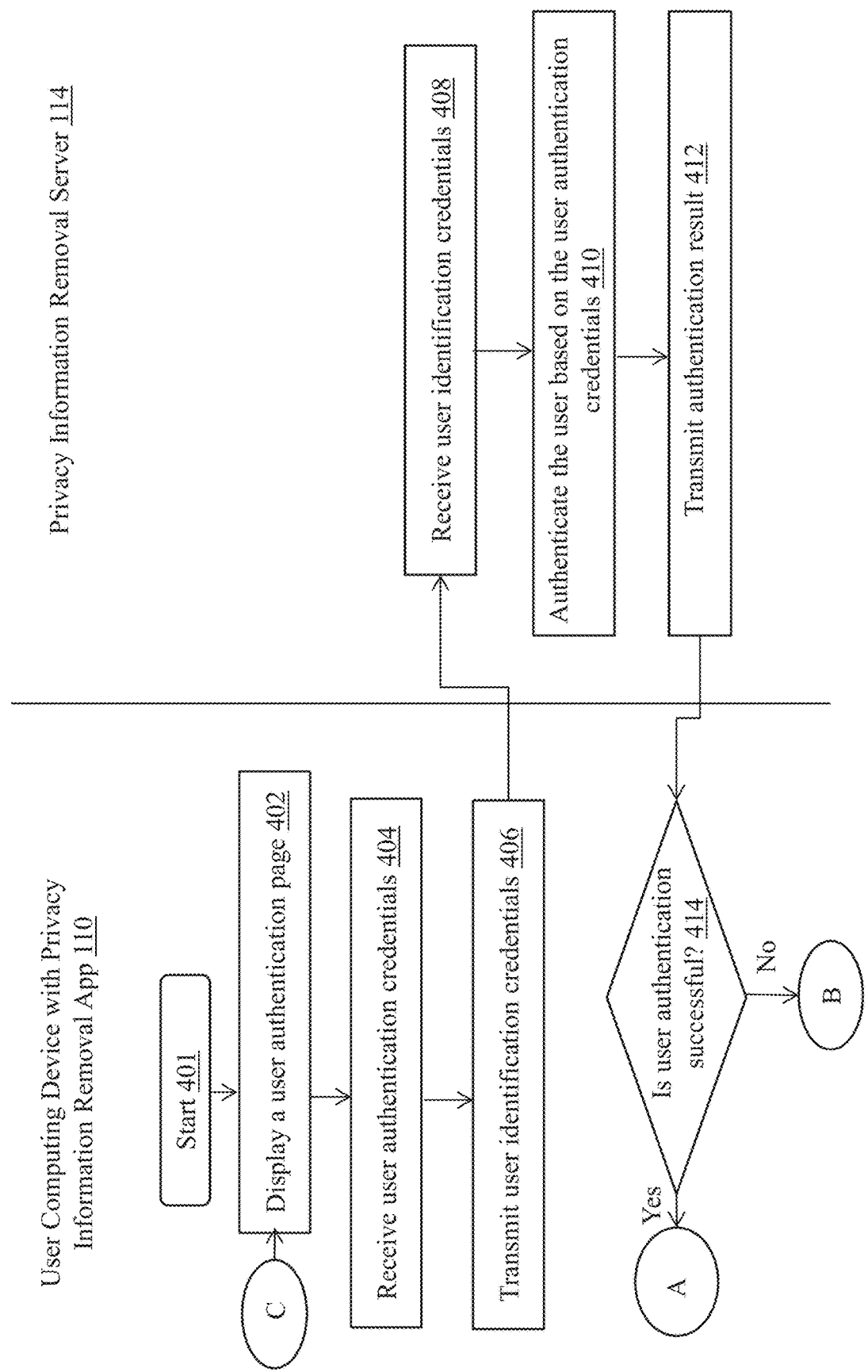
FIGS. 4A-4D (collectively 'FIG. 4') are flowcharts that illustrate an example method of removing a user's private data from one of more systems of a vehicle, in accordance with example embodiments of the present disclosure.
Figure 4B:
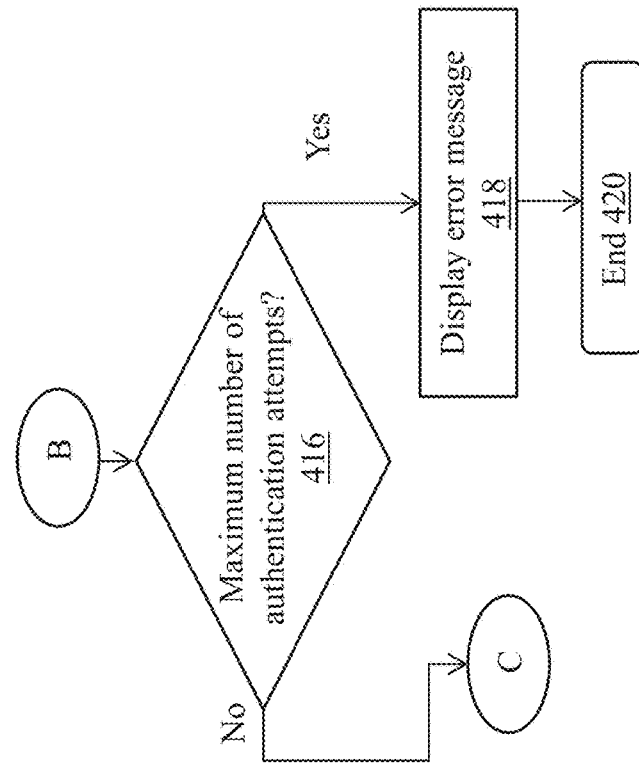
Figure 4C:
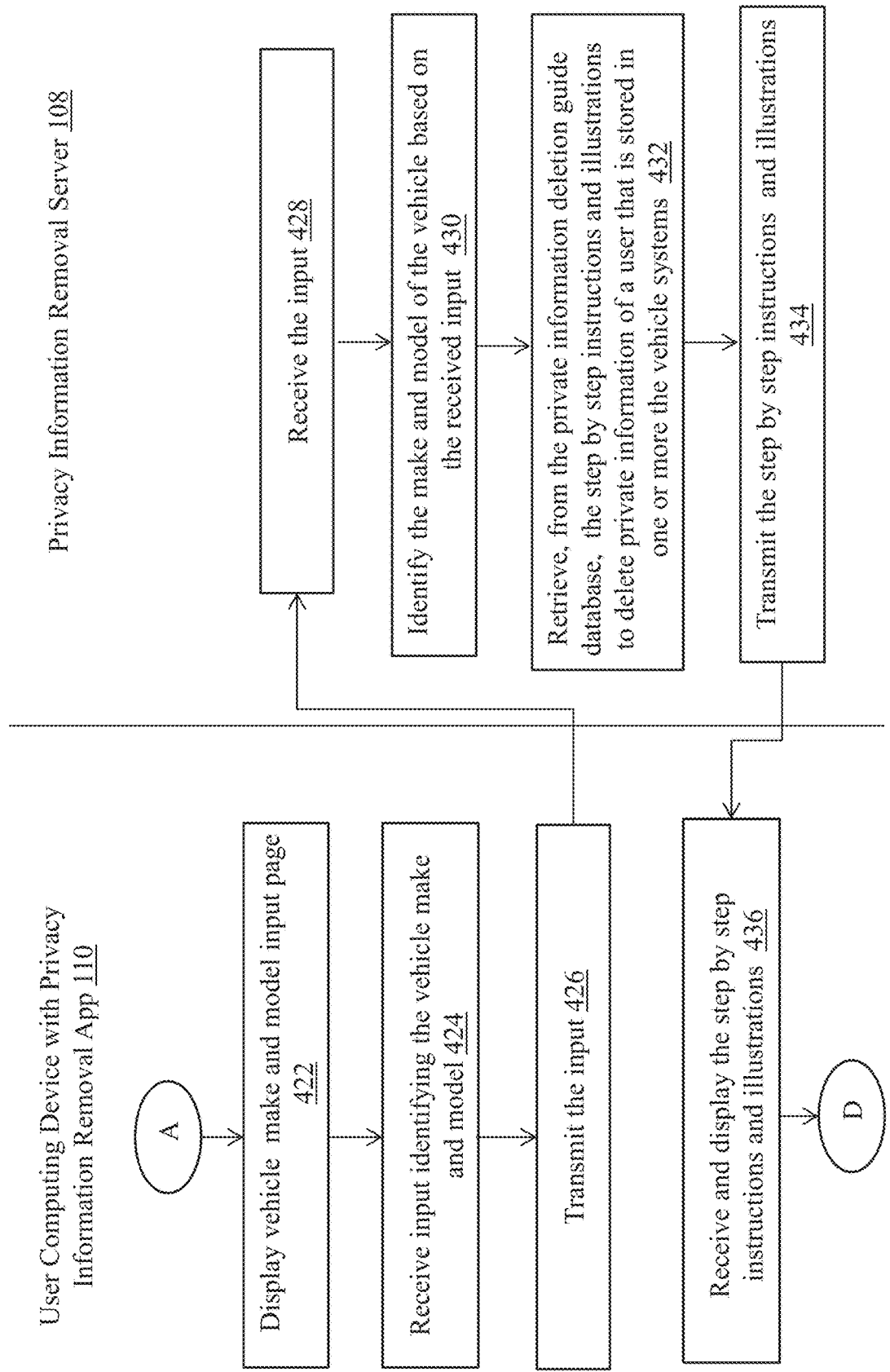
Figure 4D:
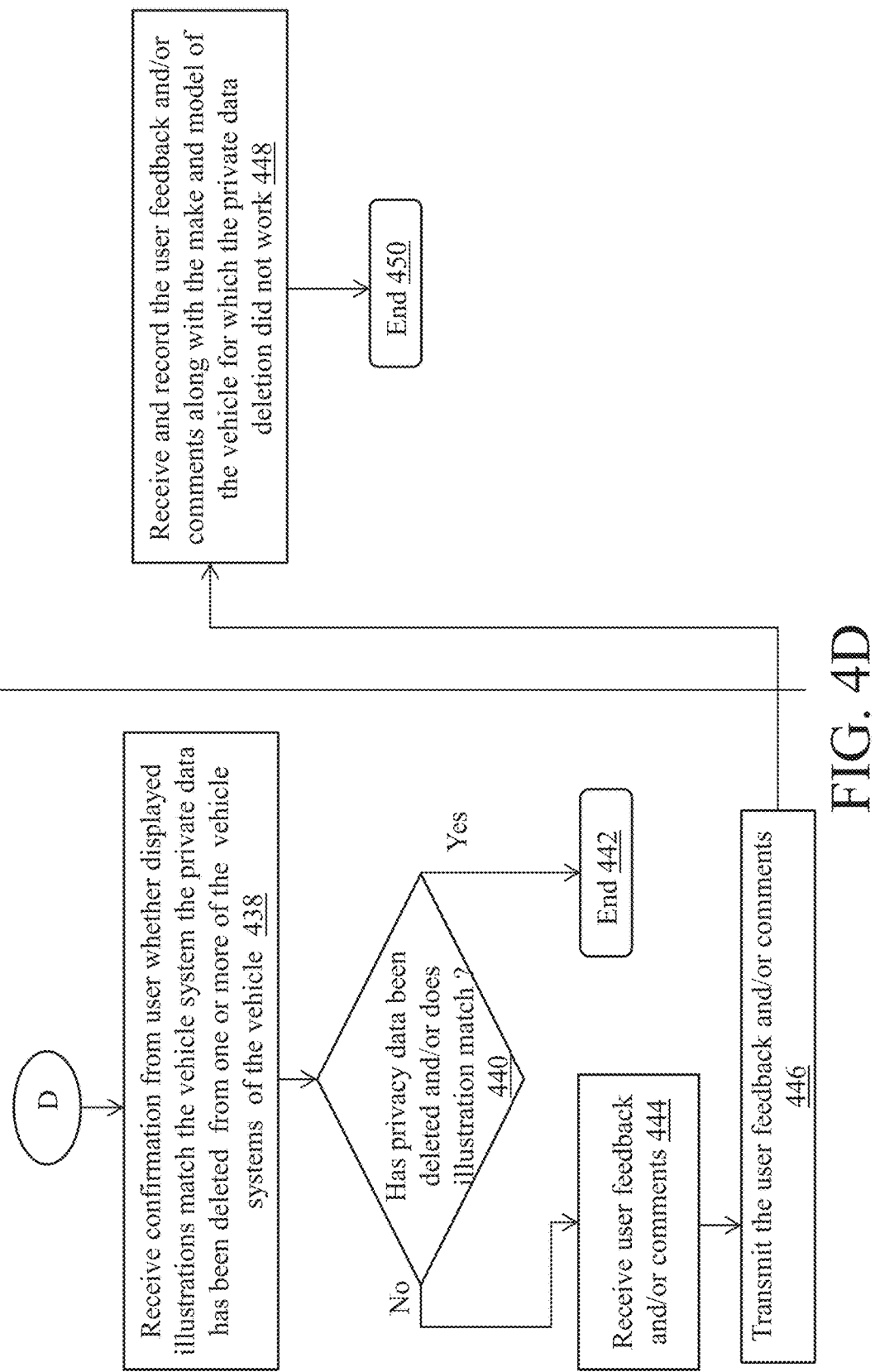

The operation of the privacy information removal system 100 will be described below in greater detail in association with FIGS. 3-4 and 6 by referring to FIGS. 2 and 5 which illustrates the various example components of the privacy information removal server 114. FIGS. 3-4 and 6 illustrate flowcharts associated with the operation of the privacy information removal system. Although specific operations are disclosed in the flowcharts illustrated in FIGS. 3-4 and 6, such operations are only non-limiting examples. That is, embodiments of the present invention are well suited to performing various other operations or variations of the operations recited in the flowcharts. It is appreciated that the operations in the flowcharts illustrated in FIGS. 3-4 and 6 may be performed in an order different than presented, and that not all of the operations in the flowcharts may be performed.

All, or a portion of, the embodiments described by the flowcharts illustrated in FIGS. 3-4 and 6 can be implemented using computer-readable and computer-executable instructions which reside, for example, in a memory of the user computing device 108 or the privacy information removal server 114. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Building the Privacy Information Removal Database

Referring to FIG. 3, the process 300 of building the privacy information removal database 224 of the privacy information removal server 114 begins at operation 301 and proceeds to operation 302 where, for various makes, models, years, and/or trims of vehicles, data regarding one or more in-vehicle modules of the vehicles that store the privacy information of users are retrieved from a plurality of external data sources 112a-n. The collected data may be stored in a make and model database 218 of the privacy information removal server 114. Responsive to retrieving data regarding the in-vehicle modules of vehicles of different makes, models, years, and/or trims, in operation 304 and 306, data associated with resetting the one or more in-vehicle modules is identified and said data is parsed to remove any extraneous information. Further, in operations 308 and 310, for each vehicle make, model, year, and/or trim, instruction sets comprising step by step instructions (textual instructions) and/or corresponding images are prepared and uploaded to the privacy information removal database 224 of the privacy information removal server 114 for erasing the privacy information of users stored in the one or more in-vehicle modules of the vehicles. In one or more examples, the images associated with each instruction may include indicators (visual, auditory, etc.) such as numbered callouts (shown in FIG. 5) that are configured to indicate both the order or sequence of operations and/or portions of the in-vehicle module that the user 106 needs to interact with in each instruction to erase the privacy information.

In one example embodiment, operations 302-310 may be manually performed, for example, by a system administrator via an administrator console (e.g., computing device) (not shown) that is communicatively coupled to the privacy information removal server 114. That is, the steps of retrieving data regarding the in-vehicle modules from the multiple external data sources 112, parsing the retrieved data, preparing the instruction sets, and uploading the instruction sets to the privacy information removal database 224 via the administrator console are performed manually by a system/database administrator. For example, the administrator may collect, via the administrator console, the "long form" instructions (e.g. from manuals or videos) and synthesize them in step-by-step instructions with images, add call-outs, and/or text instructions.

However, in other example embodiments, operations 302-310 may be automatically performed by the privacy information removal server 114. For example, in operation 302, the input/output engine 202 of the privacy information removal server 114 may retrieve data regarding the in-vehicle modules for different makes, models, years, and/or trims of vehicles from the multiple external data sources 112a-n using a push or a pull mechanism. In the pull mechanism, the input/output engine 202 of the privacy information removal server 114 may crawl through data stores of the multiple external data sources 112a-n to retrieve the relevant data associated with the in-vehicle modules of the different makes, models, and/or trims of vehicles. In the push mechanism, the multiple external data sources 112a-n may be configured to push or transmit said data to the input/output engine 202 of the privacy information removal server 114 either periodically or as and when new data is available. In either case, responsive to receiving or retrieving the data regarding the in-vehicle modules for different makes, models, and/or trims of vehicles, in operations 304-310, the processor 212 and the privacy information removal steps engine 208 of the privacy information removal server 114 may operate in concert to identify data associated with resetting the in-vehicle modules, parse the identified data, prepare the instruction set with the step by step instructions and corresponding images to erase the privacy information of the user from the one or more in-vehicle modules, and store the instruction set in the privacy information removal database 224. In other words, the collection and transformation of the collected data to concise, easy to follow, and relevant instruction set with or without images and indicators can be performed either manually by a system/database administrator and uploaded to a database or automatically by the privacy information removal server 114.

It is noted that the privacy information removal database 224 may be updated periodically or as and when changes are warranted. That is, a system administrator can access the privacy information removal database 224 via an administrator console that is communicatively coupled to the privacy information removal server 114 to create, modify, delete and maintain data entries in privacy information removal database 224 and/or the other databases (218-222, and 226) of the privacy information removal server 114. For example, when the system storing personal information for a specific make and model of a vehicle is updated (for instance, a new firmware is installed by the dealer or Over The Air ("OTA"), appropriate changes may be made to the data entry associated with the discontinued vehicle make and model in the privacy information removal database 224. In another example, when a new make and model of a vehicle enters the market, the system administrator may create a new data entry for the new vehicle make and model.

Furthermore, in the case of business-to-business models, the billing and tracking of the usage of the instruction sets may be based on the VIN of the vehicle. In a business-to-business model, such as when the privacy information removal system 100 is used by a rental agency, a Digital Right Management tool or the usage tracking engine 210 within the system will grant the VIN numbers of all or a plurality of the vehicles of the rental agency to be erased by users without usage limits. Additionally, in the business-to-business model involving the rental agency, when the rental agency sells a vehicle, the Digital Right Management or the usage tracking engine 210 would receive notification from the rental car company that the vehicle has been disposed from their fleet, and consequently the unlimited usage rights have expired.

Erasing the Privacy Information of a User from In-Vehicle Modules of a Vehicle

Before discussing the FIGS. 4 and 6, it may assist the reader to understand that the in-vehicle module 104 from which privacy information of a user 106 is to be removed may be interchangeably referred to as a target in-vehicle module or actual in-vehicle module without departing from a broader scope of the present disclosure. Similarly, the vehicle 102 that is associated with the in-vehicle module 104 may be interchangeably referred to as a target vehicle without departing from a broader scope of the present disclosure. Further, the in-vehicle modules associated with the set of in-vehicle modules of vehicles that are related to the vehicle 102 (as described above in association with FIGS. 4 and 6) may be interchangeably referred to as candidate in-vehicle modules associated with the set of candidate in-vehicle modules, without departing from a broader scope of the present disclosure.

The term 'other vehicle that are related to the vehicle 102' or 'vehicles that are related to the vehicle 102' may refer to any appropriate vehicle that may be associated with the target vehicle 102 based on one or more parameters such as, but not limited to, a make, a model, a model year, an OEM group, a body type, a trim, etc., associated with the vehicle 102. For example, a vehicle having the same make, model, and model year, but having a trim level that is different from that of the vehicle 102 may be considered as a vehicle that is related to the vehicle 102. Similarly, in another example, a vehicle the belongs to the same OEM group but having a makes, models, and trim levels that is different from that of the vehicle 102 may be considered as a vehicle that is related to the vehicle 102.

Referring to FIG. 4, the process 400 of erasing the privacy information of the user 106 from one or more in-vehicle modules 104 of the vehicle 102 begins at operation 401 where the user 106 accesses the privacy information removal application 110 on the user computing device 108. As described above, the privacy information removal application 110 may be: (a) downloaded by the user 106 as a stand-alone application, (b) embedded in a third-party application that is downloaded on the user computing device 108, or (c) offered as a service via a web server or an API. In either case, when the user 106 opens the privacy information removal application 110, in operation 402, a user authentication page may be presented to the user 106 via a display of the user computing device 108. The user authentication page prompts the user 106 to provide user authentication credentials that the user may have created while registering with the privacy information removal system 100 to receive the services offered by the privacy information removal system 100. The user registration information may be stored in the registered user database 220 of the privacy information removal server 114 and may include, but is not limited to, user identification, user authentication credentials, financial data associated with the user for the purposes of billing, etc. Additionally, during registration, the user 106 may specify a billing plan of the user's choice. Example billing plans can include, but are not limited to, payment per use; payment per N uses; weekly, monthly, or yearly subscription; etc. Based on the user's choice of billing plan, the billing database 222 maps the user identification information of the registered user to the billing plan of the registered user's choice. Further, the billing database 222 is also configured to maintain a list of the available billing plans and track the billing details associated with each registered user 106 based on their choice of billing plan.

Alternatively, rather than registering and billing users, the usage tracking engine 210 may trigger billing based on the Digital Rights Management related to the scanned VIN (for instance, as in the example above, if a VIN belongs to a fleet what has purchased unlimited deletions, every time that VIN is scanned no billing will be triggered).

Referring to operation 402, responsive to displaying the user authentication page, in operations 404-406, the user computing device 108 receives user authentication credentials from the user 106 and transmits the user authentication credentials to the privacy information removal server 114. In operation 408, the input/output engine 202 of the privacy information removal server 114 receives the user authentication credentials of the user 106 from the user computing device 108 and forwards the user authentication credentials to the user authentication engine 204 of the privacy information removal server 114. In operation 410, the user authentication engine 204 operates in concert with the registered user database 220 to authenticate the user 106 based on the received user authentication credentials and the authentication credentials of the user 106 stored in the registered user database 220. Further, in operation 412, the user authentication engine 204 operates in concert with the input/output engine 202 to transmit the authentication result to the user computing device 108. In operation 414, upon receiving the authentication result and determining that the user authentication has been unsuccessful, in operations 416-420, the privacy information removal application 110 provides another authentication opportunity to the user 106, provided the maximum number of allowed authentication attempts have not been exhausted. If the maximum number of allowed authentication attempts have been exhausted, the privacy information removal application 110 may display an error message via a display of the user computing device 108 and ends the process 400. In some example embodiments, the user registration and authentication steps may be omitted.

However, in operation 414, upon determining that the user 106 has been successfully authenticated, in operation 422, the privacy information removal application 110 displays a vehicle make and model input page 501 (shown in FIG. 5) via a display of the user computing device 108. In some example embodiments, once the user 106 has been successfully authenticated and logged in, the user 106 may remain logged in till the user 106 expressly selects and option to log out. As such, if the user has not expressly logged out, the user 106 does not have to input or provide authentication credentials each time the user accesses the privacy information removal application 110.

The vehicle make and model input page 501 prompts the user 106 to provide a vehicle information that can be used to identify the vehicle 102. In particular, the vehicle information may be configured to determine vehicle parameters such as, but not limited to, the make, model, year, trim, and/or any other appropriate information associated with the vehicle 102. The vehicle parameters may be used to retrieve instruction sets associated with erasing privacy information of the user 106 from one or more in-vehicle modules 104 of the vehicle 102. The instruction sets may be retrieved from a privacy information removal database 224 of the privacy information removal server 114. In the example embodiment illustrated in FIG. 5, the vehicle information may include a manual selection of the make, model, and year that is selected from predefined dropdown lists 511 displayed to the user 106 in the vehicle make and model input page 501. However, in another example embodiment, the vehicle information may include a vehicle identification number (VIN) of the vehicle 102 that may be manually inputted by the user 106 in a vehicle identification field 512 or obtained by scanning barcodes (or any other codes, such as QR codes) that represent the VIN (or are uniquely associated with a VIN, such as a rental fleet unit number or a plate number) by using an image or code scanning feature of the user computing device 108.

In yet another example embodiment, the vehicle information may include an image of an exterior of the vehicle 102, an interior of the vehicle, a dashboard or infotainment system of the vehicle 102 that can be used to determine the vehicle parameters and thereby identify the vehicle. In the example embodiment where the vehicle information comprises images of the infotainment systems or in general a recognizable part of the exteriors or interiors of the vehicle, vehicle parameters such as, but not limited to, the vehicle make, model, and year may be determined by running a computer vision artificial intelligence software that compares the current image with a database of past images, where the past images are collected independently from vehicle image databases but also over time by the privacy information removal application 110 itself. For example, a user would take a photo or point the camera at the interior of the vehicle (if using in augmented reality mode), and the computer vision artificial intelligence software would determine the most likely matches based on the images of the hardware and firmware. The determination of the vehicle's make, model, model year, and/or trim level based on the captured image using artificial intelligence is described in greater detail in the U.S. patent application Ser. No. 15/411, 543, filed on Jan. 20, 2017 in the name of Andrea Amico and Mohit Prabhushankar and titled "Artificial Intelligence Based Vehicle Dashboard Analysis," and the entire contents of which is hereby incorporated herein by reference.

In some examples where the image of the infotainment system is provided as input, the vehicle parameters determined by the server 114 may include the make, model, version, etc., of the infotainment system. The user 106 may capture the image by using an image capture feature of the user computing device 108.

In some other example embodiments, the vehicle information may include Wi-Fi and Bluetooth MAC addresses (but potentially RFIDs, wireless keys, and other connected/radio emitting vehicle sensors) of the vehicle 102 of the in-vehicle modules 104 that may be transmitted by the vehicle 102 and/or the in-vehicle modules 104. The computing device 108 may be configured to capture the radio frequency signals transmitted by the vehicle 102 and/or the in-vehicle modules 104, where the radio frequency signals may include, but is not limited to, the Wi-Fi and Bluetooth MAC addresses of the vehicle 102 and/or the in-vehicle modules 104. In said some other example embodiments, a reverse lookup may be performed either by the user computing device 108 or the privacy information removal server 114 on private or public sources (e.g. IEEE listings of assigned MAC addresses) to uniquely determine the in-vehicle module manufacturer (e.g., infotainment system manufacturer) and the approximate date of manufacturing, which would yield an approximation for the system version of the in-vehicle module 104.

In operations 424-426, the user computing device 108 receives the vehicle information and transmits the vehicle information to the privacy information removal server 114. In operation 428, the input/output engine 202 of the privacy information removal server 114 receives the vehicle information and forwards said vehicle information to the make and model engine 206 of the privacy information removal server 114 if the information is anything other than a make, mode, and year that is selected by the user from the drop down lists 511 (e.g., if information is VIN, bar code, QR code, image of dashboard, image of in-vehicle module, live feed of image of interior of vehicle and in-vehicle module, etc.). Responsively, in operation 430, the make and model engine 206 operates in concert with the make and model database 218 to identify the vehicle parameters associated with the vehicle 102 such as, but not limited to, the make, model, trim, year, and/or any other appropriate feature of the vehicle 102 that uniquely identifies the vehicle 102. The make and model database 218 may include, but is not limited to, a listing of all the makes, models, years, and/or trims of vehicles; a mapping of VINs to specific makes, models, trims, and/or other features of a vehicle; and/or images of vehicle dashboards and infotainment systems for all the makes, models, and/or versions of in-vehicle modules. When the vehicle information is an image of the dashboard or infotainment system of the vehicle 102 or a live feed of a portion of the vehicle 102, the processor 212 of the privacy information removal server 114 processes the image and/or live feed using suitable image processing tools and operates in concert with the make and model database 218 to identify the vehicle parameters of the vehicle 102.

Responsive to identifying the vehicle parameters of the vehicle 102, in operation 432, the make and model engine 206 forwards the identified vehicle parameters of the vehicle 102 to the privacy information removal steps engine 208. The privacy information removal steps engine 208 operates in concert with the privacy information removal database 224 to query the privacy information removal database 224 and retrieve and create a file comprising data associated with erasing privacy information from a set of in-vehicle modules (hereinafter 'data associated with the set of in-vehicle modules'), where the set of in-vehicle modules may include the set of in-vehicle modules include the in-vehicle module 104 of the vehicle 102 matching the identified make, model, year, and/or trim; and/or in-vehicle modules of other vehicles that most-likely match or are related to the vehicle 102 of the identified make, model, year, and/or trim. The file comprising data associated with the set of in-vehicle modules may be created based on one or more of the vehicle parameters that are identified based on the vehicle information received from the computing device 108. In one example embodiment of operation 432 where the file comprising the data associated with the set of in-vehicle modules is created based on the make, model, and year of the vehicle 102 may be described below in greater detail in association with FIG. 6.

Turning to FIG. 6, the example process of creating the file (e.g., data file) (hereinafter 'privacy information removal file') comprising the data associated with the set of in-vehicle modules (i.e., candidate in-vehicle modules) begins at operation 602 where the privacy information removal steps engine 208 receives example vehicle parameters, i.e., the make, the model, and the model year of the vehicle 102 that comprises the in-vehicle module 104 from which privacy information of the user 106 is to be removed. Responsive to receiving information regarding the make, the model, and the model year of the vehicle 102; in operations 604 and 606, the privacy information removal steps engine 208 (hereinafter 'privacy engine 208) queries the privacy information removal database 224 (hereinafter 'privacy database 224) to determine if the privacy database 224 includes one or more instruction sets associated with erasing privacy information from a candidate in-vehicle module of a vehicle that matches the make, model, and model year of the vehicle 102. In some example embodiments, for a given make, model, and model year of a vehicle, the privacy database 224 may include multiple instruction sets associated with different trims and/or body types of the vehicle. For example, for a 2012 Nissan Rogue, the privacy database 224 may include multiple instruction sets associated with erasing privacy information from in-vehicle modules present in different trims of the 2012 Nissan Rogue such as in-vehicles modules in 2012 Nissan Rogue S, 2012 Nissan Rogue SV, 2012 Nissan Rogue SL, etc.

Responsive to a positive determination that there is only one instruction set associated with erasing privacy information from a candidate in-vehicle module of a vehicle that matches the make, model, and model year of the vehicle 102, in operation 610, the privacy engine 208 may retrieve the available instruction set and add it to the privacy information removal file. Alternatively, in response to a positive determination that there are multiple instruction sets, in operation 608, the privacy engine 208 may sort the instruction sets based on user rating associated with each of the instruction sets and add the sort instruction sets to the privacy information removal file. However, in other examples, the instruction sets may be sorted based on any other appropriate pre-determined criterion without departing from a broader scope of the present disclosure. In the example described above, for the 2012 Nissan Rogue, the instruction set associated with 2012 Nissan Rogue SL may have an average rating of 4.2 stars (rating from 1 star to 5 stars, where 5 stars represent the instruction set based on which a user was able to successfully remove privacy information from the in-vehicle module and the image of the in-vehicle module exactly matched the actual in-vehicle module), the 2012 Nissan Rogue SV may have an average rating of 4.9 stars, and 2012 Nissan Rogue S may have an average rating of 3 stars. Accordingly, in said example, the instruction set associated with the 2012 Nissan Rogue SV may be positioned above 2012 Nissan Rogue SL and 2012 Nissan Rogue S. In some example embodiments, instead of adding all the sorted instruction sets to the privacy information removal file, only the highest rated instruction set may be added to the privacy information removal file.

The users may use the example star ratings (1 star-5 star rating) after using an instruction set to describe how well it worked. Over time, the star ratings for a given instruction sets accumulate, so values for any given set of instructions range from 0 (new instruction set, never used before) to 5 (every time the instruction set has been used, it has received 5 stars). Said values associated with the instruction sets may also be used to sort when multiple instruction sets are present.

In some example embodiments, responsive to adding the instruction sets associated with the in-vehicle modules of the vehicle that matches the make, model, and model year of the vehicle 102, the privacy engine 208 proceeds to operation 612 to add instruction sets associated with erasing privacy information from candidate in-vehicle modules of other vehicles that are related to the vehicle 102. However, in other example embodiments, the privacy engine 208 may proceed to operation 612 only if instruction sets associated with the candidate in-vehicle modules of the vehicle that matches the make, model, and model year of the vehicle 102 are unavailable. In operation 604, if the privacy engine 208 determines that the privacy database 224 does not include instruction sets associated with erasing privacy information from a candidate in-vehicle module of a vehicle that matches the make, model, and model year of the vehicle 102, the privacy engine 208 proceeds to operation 612.

In operations 612-614, the privacy engine 208 queries the privacy database 224 to determine if the privacy database 224 includes one or more instruction sets associated with erasing privacy information from a candidate in-vehicle module of a vehicle having the same make and model of the vehicle 102 but having a model year that varies from or is greater than the model year of the vehicle 102 by one year. That is, in the example provided above, for a 2012 Nissan Rogue, the privacy engine 208 determines if the privacy database 224 includes instruction sets associated with erasing privacy information from in-vehicle modules present in the 2013 Nissan Rogue. Responsive to a positive determination that there is only one instruction set associated with erasing privacy information from a candidate in-vehicle module of a vehicle having the same make and model of the vehicle 102 but having a model year that is greater than the model year of the vehicle 102 by one year, in operation 618, the privacy engine 208 may retrieve the available instruction set and add it to the privacy information removal file. Alternatively, in response to a positive determination that there are multiple instruction sets, in operation 616, the privacy engine 208 may sort the instruction sets based on user rating associated with each of the instruction sets and the sorted instruction sets are added to the privacy information removal file.

Responsive to adding the instruction sets associated with the in-vehicle modules of the vehicle having the same make and model of the vehicle 102 but having a model year that is greater than the model year of the vehicle 102 by one year, the privacy engine 208 proceeds to operation 620 to add instruction sets associated with erasing privacy information from candidate in-vehicle modules of other vehicles that are related to the vehicle 102. In other example embodiments, the privacy engine 208 may proceed to operation 620 only upon a negative determination in operation 612. In operation 612, if the privacy engine 208 determines that the privacy database 224 does not include instruction sets associated with erasing privacy information from a candidate in-vehicle module of a vehicle having the same make and model of the vehicle 102 but having a model year that is greater than the model year of the vehicle 102 by one year, the privacy engine 208 proceeds to operation 620.

Then, in operations 620-622, the privacy engine 208 queries the privacy database 224 to determine if the privacy database 224 includes one or more instruction sets associated with erasing privacy information from a candidate in-vehicle module of a vehicle having the same make and model of the vehicle 102 but having a model year that is one year lesser than the model year of the vehicle 102. That is, in the example provided above, for a 2012 Nissan Rogue, the privacy engine 208 determines if the privacy database 224 includes instruction sets associated with erasing privacy information from in-vehicle modules present in the 2011 Nissan Rogue. Responsive to a positive determination that there is only one instruction set associated with erasing privacy information from a candidate in-vehicle module of a vehicle having the same make and model of the vehicle 102 but having a model year that is one year less than the model year of the vehicle 102, in operation 626, the privacy engine 208 may retrieve the available instruction set and add it to the privacy information removal file. Alternatively, in response to a positive determination that there are multiple instruction sets, in operation 624, the privacy engine 208 may sort the instruction sets based on user rating associated with each of the instruction sets and the sorted instruction sets are added to the privacy information removal file.

Responsive to adding the instruction sets associated with the candidate in-vehicle modules of the vehicle having the same make and model of the vehicle 102 but having a model year that is one year lesser than the model year of the vehicle 102, the privacy engine 208 proceeds to operation 628 to add instruction sets associated with erasing privacy information from candidate in-vehicle modules of other vehicles that are related to the vehicle 102. In other example embodiments, the privacy engine 208 may proceed to operation 628 only upon a negative determination in operation 620. Further, in operation 620, if the privacy engine 208 determines that the privacy database 224 does not include instruction sets associated with erasing privacy information from a candidate in-vehicle module of a vehicle having the same make and model of the vehicle 102 but having a model year that is one year lesser than the model year of the vehicle 102, the privacy engine 208 proceeds to operation 628.

In operation 628, the privacy engine 208 queries the privacy database 224 to determine if the privacy database 224 includes instruction sets associated with erasing privacy information from candidate in-vehicle modules of vehicles of all the other models having the same make and model year of the vehicle 102. That is, in the example provided above, for a 2012 Nissan Rogue, the privacy engine 208 determines if the privacy database 224 includes instruction sets associated with erasing privacy information from in-vehicle modules present in the 2012 Nissan Altima, 2012 Nissan Versa, 2012 Nissan Maxima, 2012 Nissan Juke, 2012 Nissan Armada, etc. Responsive to a positive determination that there are instruction sets associated with at least one other model of the vehicle having the same make and model year of the vehicle 102, in operation 632, the privacy engine 208 may sort the instruction sets based on user rating associated with each of the instruction sets and the sorted instruction sets are added to the privacy information removal file.

Then, in operations 634-648, the privacy engine 208 queries the privacy database 224 to determine if the privacy database 224 includes instruction sets associated with erasing privacy information from candidate in-vehicle modules of a vehicle having the same make and model of the vehicle 102 but having a model year that is two year less than and two years more than the model year of the vehicle 102. That is, in the example provided above, for a 2012 Nissan Rogue, the privacy engine 208 determines if the privacy database 224 includes instruction sets associated with erasing privacy information from in-vehicle modules present in the 2014 Nissan Rogue and 2010 Nissan Rogue. Responsive to a positive determination that there are one or more instruction sets associated with the vehicle having the same make and model of the vehicle 102 but having a model year that is two year less than and two years more than the model year of the vehicle 102, the privacy engine 208 may sort the instruction sets based on user rating associated with each of the instruction sets and the sorted instruction sets are added to the privacy information removal file.

Then, in operations 650-660, the privacy engine 208 queries the privacy database 224 to determine if the privacy database 224 includes instruction sets associated with erasing privacy information from candidate in-vehicle modules of vehicles of all the other models of the same make of the vehicle 102 but with model years that are one year more than and one year less than the model year of the vehicle 102. That is, in the example provided above, for a 2012 Nissan Rogue, the privacy engine 208 determines if the privacy database 224 includes instruction sets associated with erasing privacy information from in-vehicle modules present in the 2011 Nissan Altima, 2013 Nissan Altima, 2011 Nissan Versa, 2011 Nissan Versa, 2011 Nissan Maxima, 2013 Nissan Maxima, 2011 Nissan Armada, 2013 Nissan Armada, etc. Responsive to a positive determination that there are instruction sets associated with at least one other model of the vehicle having the same make and model year that is one year less than and one year more than the model year of the vehicle 102, the privacy engine 208 may sort the instruction sets based on user rating associated with each of the instruc-tion sets and the sorted instruction sets are added to the privacy information removal file. Responsively, the process may end at operation 662.

In some example embodiments, the instruction sets included in the privacy information removal file may be arranged based on a ranking that represents a likely order of resemblance of the in-vehicle modules (i.e., candidate in-vehicle modules) with the actual in-vehicle module 104 (i.e., target in-vehicle module) of the vehicle 102. In the example process illustrated in FIG. 6, the instruction sets associated with candidate in-vehicle modules of vehicles that match the make, model, and model year of the vehicle 102 (e.g., instruction sets in operations 608 and 610) may be ranked higher than the instruction sets associated with candidate in-vehicle modules of other vehicles that may have the same make and model of the vehicle 102, but have another model year; or the same make and model year, but a different model; etc. The ranking and/or likely order of resemblance may be added to the privacy information removal file. The privacy information removal application 110 may use the ranking to determine an order in which the instruction sets or images of the set of candidate in-vehicle modules may be displayed to the user 106 (e.g., see 502 of FIG. 5). For example, the image of the candidate in-vehicle module that matches the make, model, and model year of the vehicle 102 and is ranked highest may be displayed first followed by the images of the remaining candidate in-vehicle modules of the set of in-vehicle modules based on their ranking or likely order of resemblance with respect to the actual in-vehicle module.

In other example embodiments, the instruction sets may be arranged in any other order based on any other ranking criteria without departing from a broader scope of the present disclosure. For example, when a user searches for a privacy information removal data associated with a vehicle having a certain make, model year, model, if the privacy engine 208 knows that historically users who selected that vehicle had the best outcome (meaning gave the highest rating) with a certain instruction set, the privacy engine 208 may override the algorithm or the above described process of creating the privacy information removal file and use the historical heuristics to re-prioritize which instruction set options are displayed first. This can be done either deterministically (e.g. by building tables of outcomes for all the historical combinations of vehicle selections vs instruction selection and success) or through an Artificial Intelligence/Machine Learning algorithm.

Further, it is noted that the process of creating the privacy information removal file based on is created based on the make, model, and model year of the vehicle 102 as described above in FIG. 6 is an example process and is not limiting. That is, in other example embodiments, the privacy information removal file may be created based on additional or other vehicle parameters without departing from a broader scope of the present disclosure. For example, in addition to the make, the model, and the model year of the vehicle, the vehicle parameters may include a trim level of the vehicle. The trim levels can either be an input from the user, or determined from the VIN, or determined from images, etc. In another example, the vehicle parameters that are used to create the privacy information removal file may include geography or manufacturing location of the vehicle. The geography may affect the instruction sets because manufacturers may deploy different versions of the in-vehicle modules in different geographies. That is, the version of the in-vehicle modules installed in vehicles may be different in different geographies. Providing additional vehicle parameters in the process of creating the privacy information removal file may provide better matches of in-vehicle modules and instructions sets associated with removal of privacy information from the in-vehicle modules. That is, the additional vehicle parameters such as, but not limited to, the trim level, the geography, etc., may enhance and further refine the data of the set of in-vehicle modules included in the privacy information removal file.

In some example embodiments, in addition to or instead of vehicle parameters, the privacy engine 208 may use in-vehicle module parameters associated with the in-vehicle module 104 of the vehicle 102 to create the privacy information removal file. For example, an infotainment system manufacturer and version may be used to create the privacy information removal file. Information associated with the in-vehicle module parameters can either be provided as an input by the user 106 (who could for instance obtain it by reading the vehicle manual, from the infotainment system menus, or from labels on the hardware), but can also be indirectly assessed by detecting, for instance, a Wi-Fi or Bluetooth MAC address of the vehicle. In one example, the computing device 108 of the user 106 may include features for capturing any radio frequency signals emitted by the vehicle 102. This includes, by means of example, Wi-Fi and Bluetooth MAC addresses (but potentially RFIDs, wireless keys, and other connected/radio emitting vehicle sensors). In said example, a reverse lookup can be done on the Wi-Fi and Bluetooth MAC addresses by using private or public sources (e.g. IEEE listings of assigned MAC addresses) to uniquely determine the infotainment system manufacturer and the approximate date of manufacturing, which would yield an approximation for the version of the in-vehicle module.

Even though the present disclosure describes the privacy information removal file created by the process in FIG. 6 as comprising data associated with erasing privacy information from a set of in-vehicle modules of different model years and models, but of the same make as the make of the vehicle 102, one of skill in the art can understand and appreciate that in other example embodiments, the privacy information removal file may include instruction sets associated with in-vehicle modules of vehicles having makes other than the make of the vehicle 102 provided that the makes are associated with the same OEM group. That is, the process of creating the privacy information removal file as described in FIG. 6 does not sort instructions outside of the make that the user selected/scanned. However, one of skill in the art can understand and appreciate that in other example embodiments, instruction sets associated with in-vehicle modules across makes from the same OEM group may be included in the privacy information removal file since said in-vehicle modules may have similarities. For example, for a Jaguar vehicle, the privacy engine 208 may provide instruction sets associated with removing privacy information from in-vehicle modules of Land Rover vehicles which may be similar to the in-vehicle modules of the Jaguar vehicles because they belong to or are associated with the same OEM group.

The data associated with the set of in-vehicle modules that are included in the privacy information removal file may include instruction sets associated with erasing privacy information from each in-vehicle module of the set of in-vehicle modules. Each instruction set may include a sequence of instructions (textual commands), where each instruction may include a corresponding image with numbered callouts embedded therein (or overlaid thereon). In some example embodiments, the instruction sets may not include images and textual commands. Instead, in said some example embodiments, the instruction sets may include voice clips or files that provide voice commands for a user to follow.

Turning back to FIG. 4, responsive to creating the privacy information removal file comprising the data associated with erasing privacy information from a set of in-vehicle modules, in operations 434-436, the input/output engine 202 of the privacy information removal server 114 transmits the privacy information removal file to the user computing device 108. Responsive to receiving the privacy information removal file, the user computing device 108 displays images 502 of the set of candidate in-vehicle modules in the likely order of resemblance included in the privacy information removal file. In some example embodiments, any other appropriate visual or auditory indicators associated with the set of candidate in-vehicle modules other than the images may be presented via the computing device.

Responsive to presenting the images of the candidate in-vehicle modules, the user computing device 108 may prompt the user 106 to select one of the images of the set of candidate in-vehicle modules that matches the actual in-vehicle module 104 of the vehicle 102. Once the image of the candidate in-vehicle module that matches the actual in-vehicle module 104 of the vehicle 102 is selected, the privacy information removal application 110 may display the instruction set 503 (shown in FIG. 5) associated with removing privacy information from the selected candidate in-vehicle module. The instruction set 503 may be presented along with the corresponding images of the selected candidate in-vehicle module and callouts that the user can follow to erase the privacy information of the user 106 from the in-vehicle module 104 of the vehicle 102 by resetting the in-vehicle module 104. In some example embodiments, the instructions will have auto scroll with a delay (3-5 seconds) or alternatively, the user 106 can switch to a manual scroll.

In other example embodiments, using the camera of the user computing device 108, a live image of the in-vehicle module may be rendered on the display of the user computing device 108. In said other example embodiments, responsive to identifying the vehicle parameters of the vehicle, and the corresponding instructions for removal of privacy data from the in-vehicle modules, the privacy information removal application 110 may be configured to overlay the callouts and the related instructions over the rendered live image of the in-vehicle module. As the user executes each instruction on the in-vehicle module by following the callouts and the related instructions, the next sequence of callouts and instructions will be overlaid on the rendered live image of the in-vehicle module. In other words, as the user points the phone at the infotainment system, augmented reality may be used to display the instructions as "floating" on the actual system or the rendered live image of the actual system. For example, callout number 1 may be overlaid over a first button in the live image of the user computing device 106. When the user computing device 108 determines that the first instruction has been executed, the second callout may be overlaid over another button along with the second instruction and so on till the instruction set is exhausted or the privacy information is removed from the in-vehicle module. In some examples, the privacy information removal application 110 of the user computing device 108 can decode the pattern or movement of the user's finger(s) or hand to automatically determine that an instruction has been executed on the in-vehicle module. In other examples, the privacy information removal application 110 of the user computing device 108 generates a prompt requesting the user to provide an input indicating that the current instruction has been executed and the next instruction is to be issued/displayed.

In operations 438 and 440, the privacy information removal application 110 prompts the user 106 to confirm whether the images displayed along with the instruction set matched the in-vehicle module 104, and/or whether the user 106 was able to follow the displayed instruction set and successfully erase the privacy information of the user 106 by resetting the in-vehicle modules 104. If the user 106 confirms that the images displayed along with the instruction set matched the in-vehicle modules 104 and the user 106 was able to successfully erase the privacy information of the user 106 by following the instructions of the instruction set, then, the process 400 ends in operation 422. However, in some example embodiments, prior to ending the process 400, in operation 422, the user computing device 108 may transmit, to the privacy information removal server 114, the confirmation that the images displayed along with the instruction set matched the in-vehicle modules 104 and the user 106 was able to successfully erase the privacy information of the user 106 by following the instructions of the instruction set. The confirmation may be stored in the user experience database 226 of the privacy information removal server 114 and used to improve the instruction set, rework the instruction set, improve and optimize the creation of new instruction set, and/or improve and optimize the building of the privacy information removal database 224. In addition to being stored in the user experience database 226 of the privacy information removal server 114, a copy of the confirmation or feedback may be stored in a memory associated with the computing device 108 by the privacy information removal application 110. The confirmation or user feedback that is stored user experience database 226 may provide a record of the successful (or unsuccessful) deletion of the privacy information of the user from in-vehicle module 104 of the vehicle 102.

In some example embodiments where the user 106 is not a consumer who owns the vehicle 102, responsive to receiving the confirmation that the vehicle 102 containing the private information of the user 106 underwent a private data deletion process, the privacy information removal server 114 may be configured to store the confirmation (or feedback) and also transmit said confirmation to the owner so that the owner is made aware and has a record that the privacy information of the user 106 has been successfully removed from the vehicle 102. In another embodiment, the confirmation that the vehicle 102 containing the private information of the user 106 underwent a private data deletion process, the privacy information removal server 114 may be configured to transmit said confirmation to a third party (for example, a provider who is performing the deletion service on behalf of the owner, a vehicle history reporting provider, an OEM, etc.) so as to prove the service has been performed, and that the privacy information of the user 106 has been successfully removed from the vehicle 102.

However, if the images displayed along with the instruction set do not match the in-vehicle modules 104 and/or the user 106 was unable to successfully erase the privacy information of the user 106 by resetting the in-vehicle modules 104 by following the instructions of the instruction set, then, in operation 444, the privacy information removal application 110 may prompt the user 106 to provide feedback and/or comments regarding the user's experience. The feedback and comments may include, but are not limited to, why the user was not able to delete the privacy information; the specific instructions from the instruction set that did not work; any error messages that were displayed; an image of the in-vehicle modules 104; etc. Responsively, in operations 446-448, the feedback and comments may be transmitted to and stored in the user experience database 226 of the privacy information removal server 114 for improving and/or reworking the instruction set and/or the images for the specific make, model, year, and/or trim of the vehicle 102.

Figure 5A:
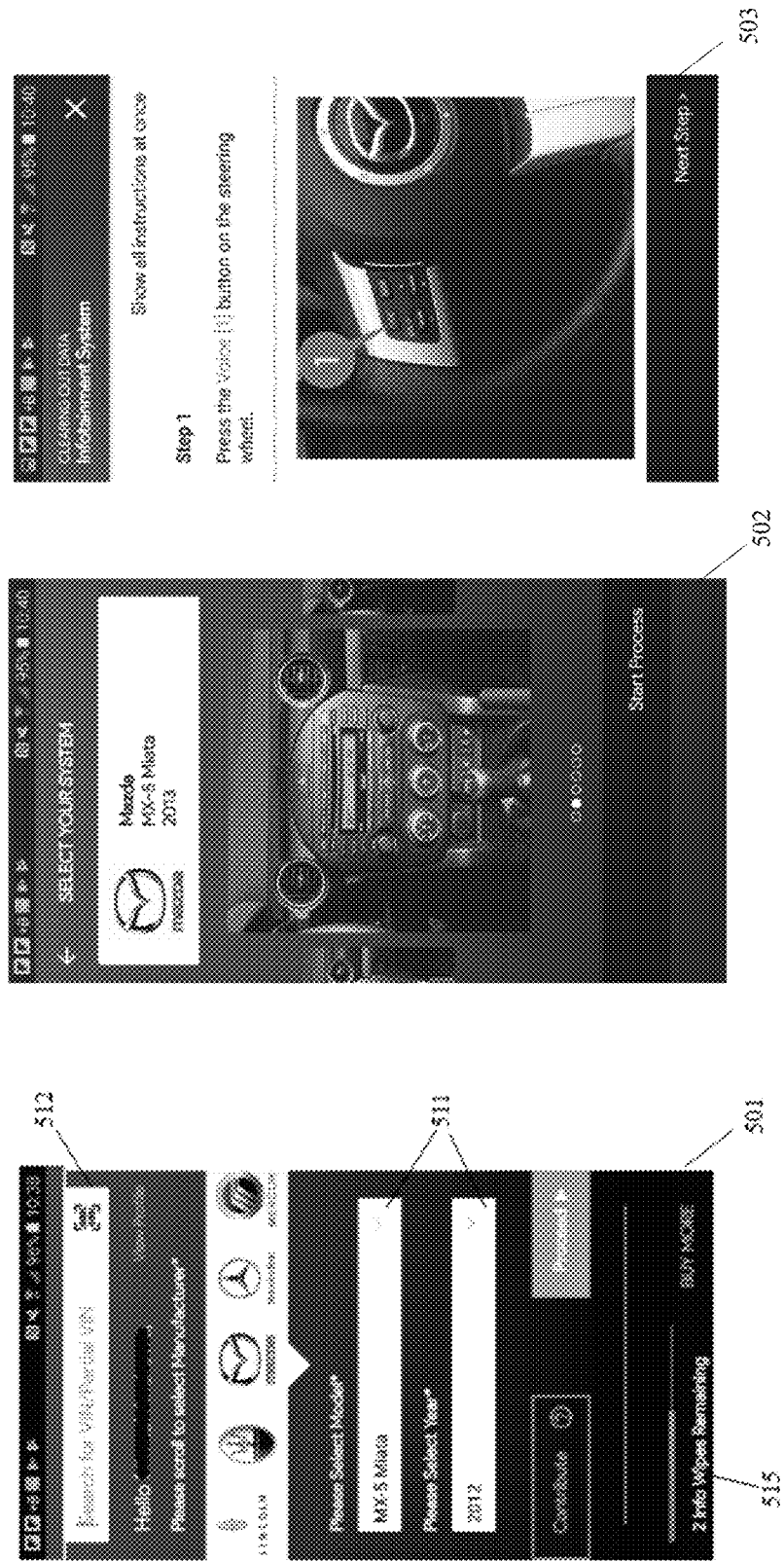
FIGS. 5A-5B (collectively 'FIG. 5') illustrates example user interface screenshots of the privacy information removal application, in accordance with example embodiments of the present disclosure.
Figure 5B:
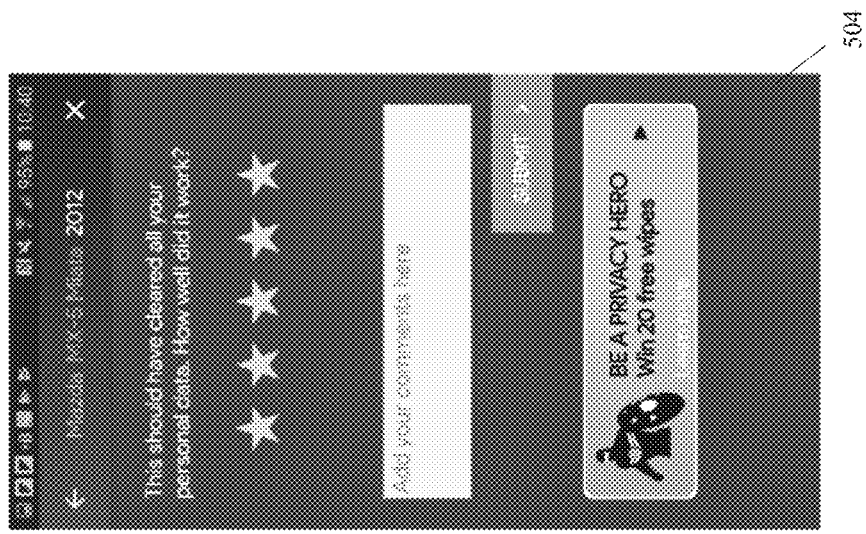
Figure 6A:
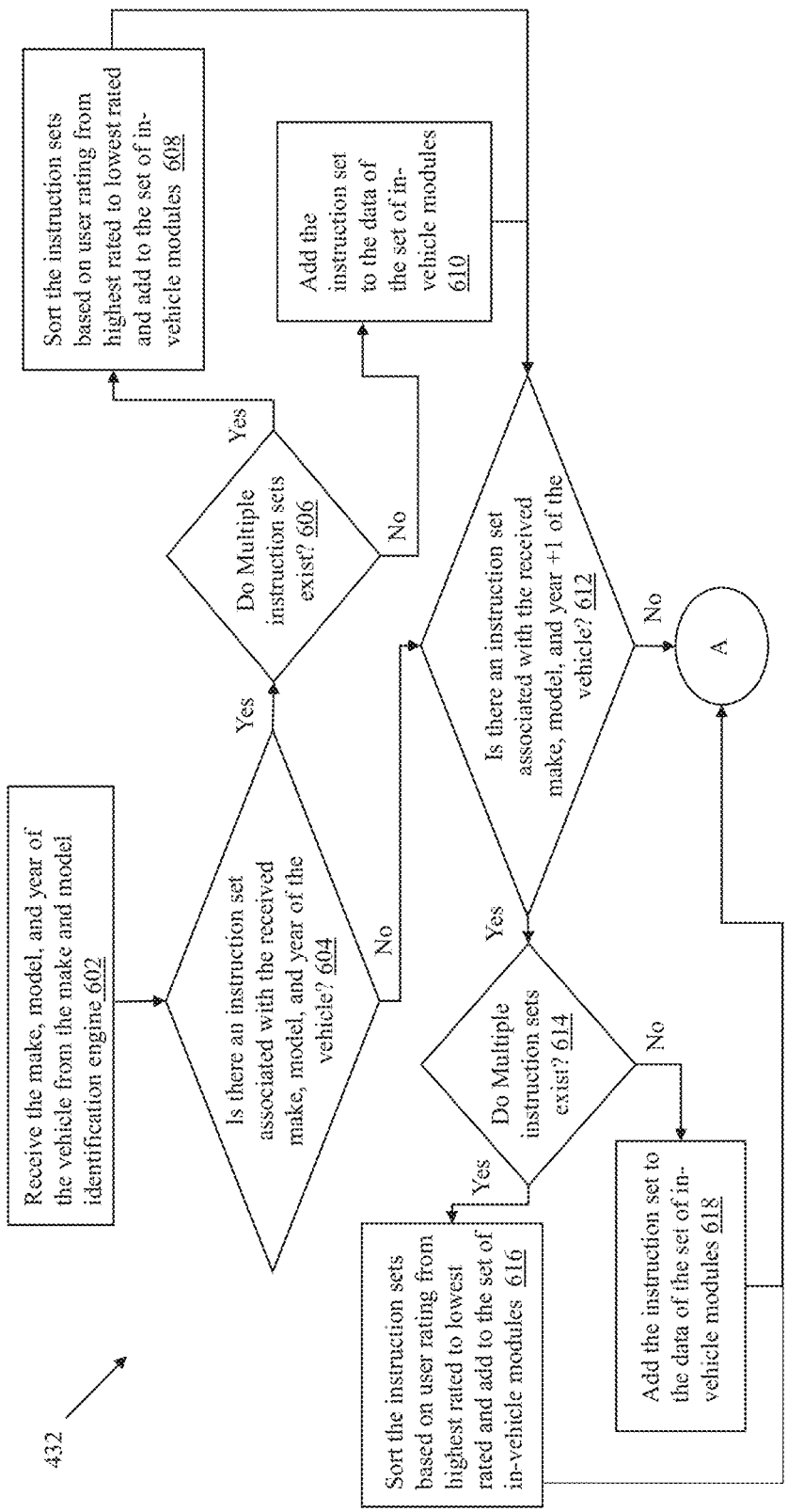
FIGS. 6A-6D (collectively 'FIG. 6') are flowcharts that illustrate an example method of creating and presenting a list of most likely in-vehicle systems and instruction sets associated with removing the user's private data from the vehicle, in accordance with example embodiments of the present disclosure.
Figure 6B:
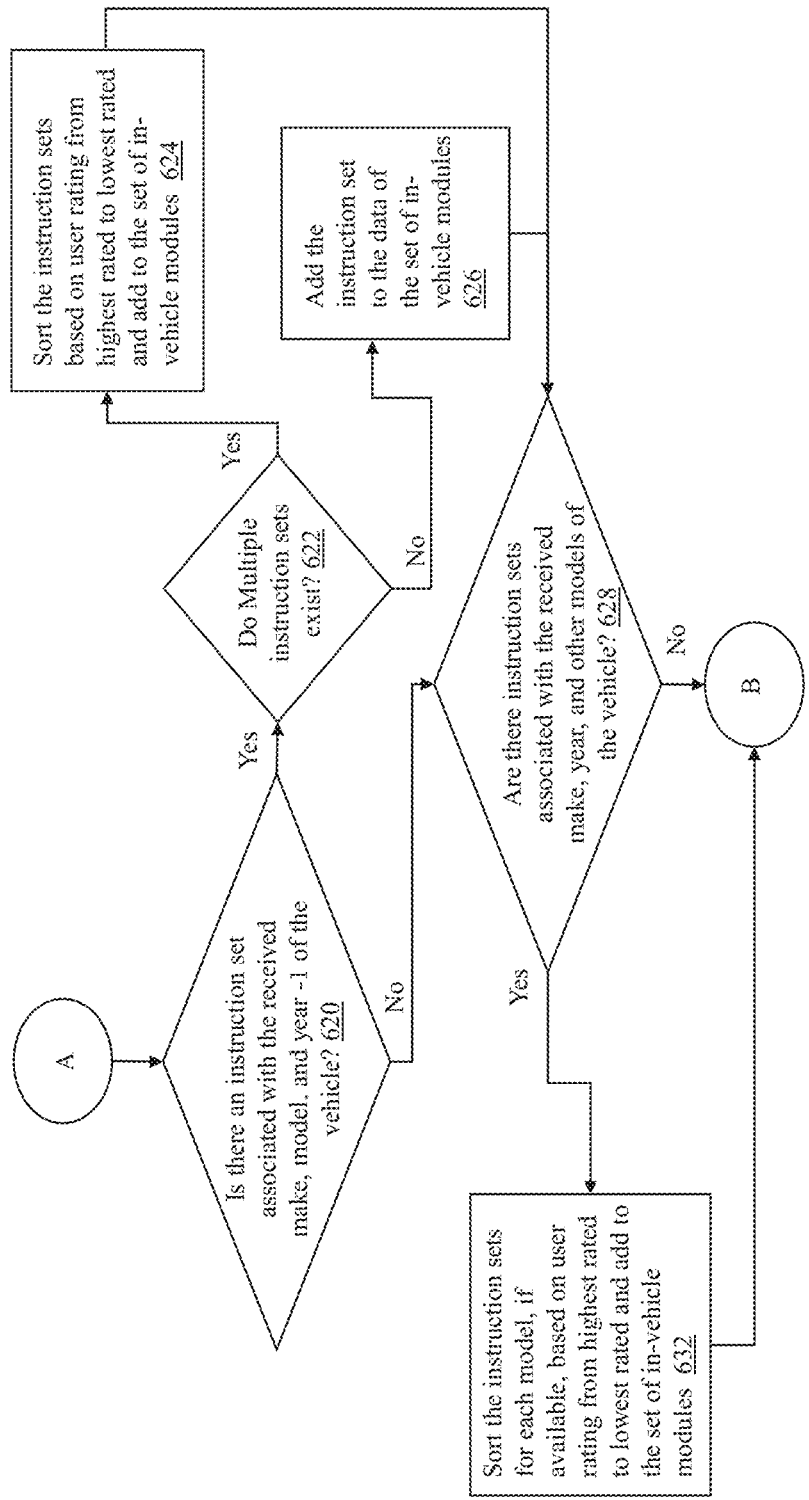
Figure 6C:
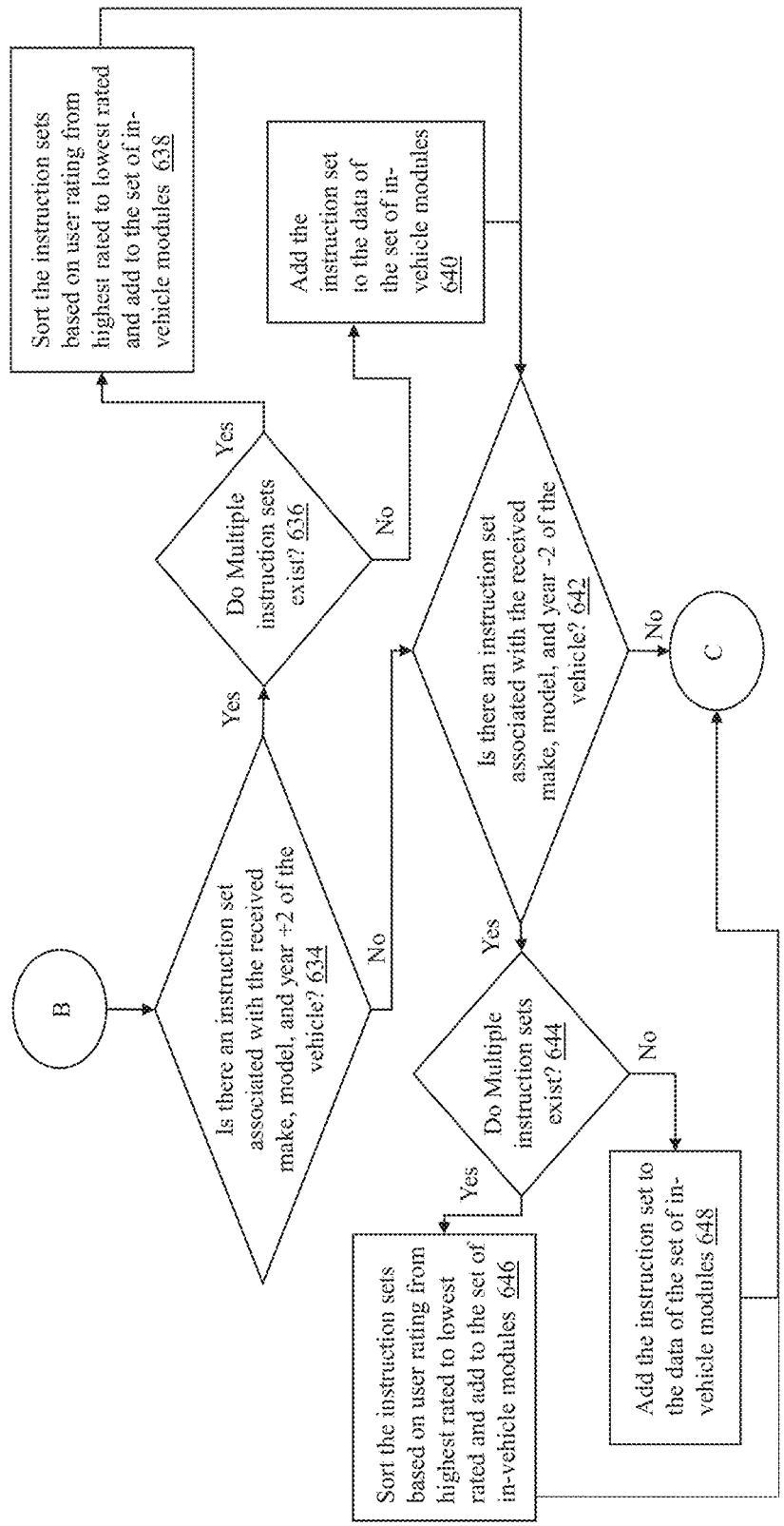
Figure 6D:
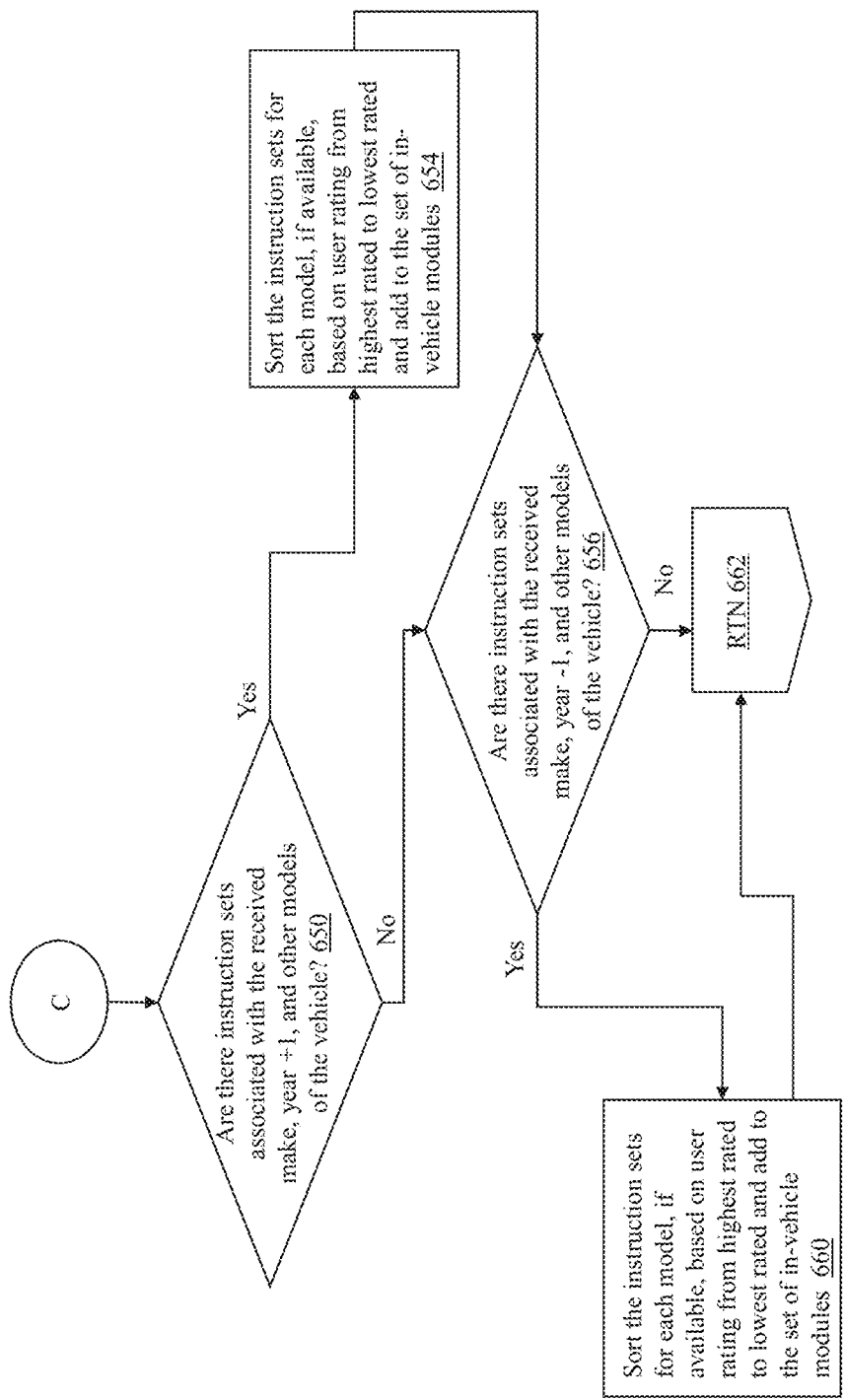

In one example, the confirmation and/or feedback regarding the quality of the images, the match of the images with the actual in-vehicle module, and/or a successful or unsuccessful removal of the privacy information based on the presented instruction set may be provided in the form of star ratings (e.g., 1-5 stars), e.g., 504 of FIG. 5. However, in other examples, any other appropriate mechanism for feedback may be provided without departing from a broader scope of the present disclosure.

In some example embodiments, when an instruction set that is presented based on the user's selection of an image of an in-vehicle module that matches or resembles the actual in-vehicle module 104 does not work, the privacy information removal server 114 may provide an alternate instruction set associated with a make, model, year, and/or trim of another vehicle that closely relates to the make, model, year, and/or trim of the vehicle 102. For example, if the instruction set associated with erasing privacy information from a 2012 Toyota Corolla does not work, then, the privacy information removal server 114 may provide an instruction set associated with erasing privacy information from a 2011 Toyota Corolla, a 2012 Toyota Camry, or a 2012 Toyota Corolla with a different trim level. That is, the alternate instruction set may be for the same make and model of the vehicle, but for another year; or the same make and year, but different model; or the same make and model, but for another trim level, etc.

In some example embodiments, based on the user feedback and comments, if it is determined that the user 106 was able to successfully erase the user's privacy information from the vehicle 102 using an alternate instruction set, then, the user experience engine 227 of the privacy information removal server 114 may de-prioritizes the initially presented instruction set and updates the initially presented instruction set with the alternate instruction set that the user 106 was able to follow to successfully erase privacy information from the in-vehicle module 104 of the vehicle 102. For example, if an initially presented instruction set for erasing privacy information from a 2012 Nissan Rogue SV does not work and instead the alternate instruction set for erasing privacy information from a 2012 Nissan Murano SL works for erasing privacy information from a 2012 Nissan Rogue SV, the user experience engine 227 of the privacy information removal server 114 may deprioritize the initially presented instruction set for the 2012 Nissan Rogue SV and updates the initially presented instruction set with the alternate instruction set for erasing privacy information from the 2012 Nissan Murano SL. Alternatively, the privacy engine 208 and/or the user experience engine 227 may deprioritize the initially presented instruction set for the 2012 Nissan Rogue SV and updates the initially presented instruction set with the alternate instruction set for erasing privacy information from the 2012 Nissan Murano SL based on user feedback (e.g., star ratings) received on both the instruction sets from multiple users over a period of time. In other words, history of user selections and outcome of selections (as determined by the star rating or feedback) may be used to override and/or rearrange the order in which the images (and corresponding instruction sets) of the set of in-vehicle modules (i.e., candidate in-vehicle modules) are presented to the user.

In some example embodiments, in operation 432, initially, one or more images of infotainment systems 502 (shown in FIG. 5) may be presented to the user 106 and the privacy information removal application 110 prompts the user 106 to select the image of an infotainment system (or any other appropriate in-vehicle module 104 from which privacy information is to be deleted) that best matches with the actual infotainment system of the vehicle 102. If none of the presented images match, then, said data may be transmitted back to and logged in the user experience database 226 of the privacy information removal server 114. However, if the one of the images of the infotainment systems presented to the user 106 matches the actual infotainment system of the vehicle 102 and the user selects said image, the privacy information removal server 114 receives the selected image of the infotainment system and responsively, provides a corresponding instruction set 503 for display via the user computing device 108 to delete privacy information from the infotainment system matching the selected image.

In addition to requesting the user to provide feedback and comments regarding the user's experience of using the provided instruction set to erase the privacy information of the user 102 from the vehicle 102, the privacy information removal application 110 may also prompt the user 106 to rate the privacy protection features and design of the vehicle 102 based on the user's experience with data privacy and security in the vehicle 102. The rating from the user(s) 106 may be stored in the user experience database 226 and used to build a privacy information protection rating for each make, model, year, and/or trim of vehicle. Said privacy protection rating of the vehicle 102 may then be used by third parties (e.g., Edmunds, Consumer Reports, KBB, etc.) or other users to identify makes and models of vehicles having good privacy information protection features, which in turn may influence a user's choice to buy a specific make and model of a vehicle.

In one or more example embodiments, any appropriate authorized user may be provided access to the user experience database 226 (and/or the privacy information removal database 224) to query the user experience database 226 to perform data analysis and generate analysis reports. For example, in a business-to-business model involving a rental agency, authorized users of the rental agency or a system administrator may be provided access to user experience database 226 for data analysis of the vehicles associated with the rental agency using their respective VINs. The data analysis of the VINs may be conducted based on: (a) location, user account, abandoned searches, success rate of instruction set; (b) number of instruction sets executed per user and/or account; (c) Make/Model/Year instructions that successfully deleted user data; (d) make/model/year instructions that did not successfully deleted user data (including feedback and free-flow user comments), etc.

Further, each time an instruction set for erasing privacy information of a user from a vehicle is transmitted to the user computing device and/or upon receiving a confirmation that the transmitted instruction set has been used to successfully erase the privacy information, the usage tracking engine 210 records the usage of the instruction set. Further, the usage tracking engine 210 operates in concert with the billing database 222 to determine: (a) if the user has opted for a per usage or N uses based payment or whether the user is a subscription member, (b) a payment based on the usage, and/or (c) whether the user has exceeded an maximum usage limit. The billing database 222 may also keep records of payment received from the user and update a status of the user, e.g., active, default, etc. Such usage information 515 may also be presented to the user via the computing device 108 as illustrated in FIG. 5.

The processor 212 of the privacy information removal server 114 may be a multi-core processor or a combination of multiple single core processors. Further, the privacy information removal server 114 may include a memory 214 that is coupled to the processor 212. The memory 214 may be non-transitory storage medium, in one embodiment, and a transitory storage medium in another embodiment. The memory 214 may include instructions that may be executed by the processor 212 to perform operations of the privacy information removal server 114. In other words, operations associated with the different engines 202-227 may be executed using the processor 212. Further, the privacy information removal server 114 may be communicatively coupled and communicated with the external data sources 112a-n and the user computing device 108 via the network interface 216.

Further, in some example embodiments, the privacy information removal system 100 may be configured to offer different languages. That is, in said some examples, the privacy information removal server 114 may be configured to create a technical dictionary or technical terms database that stores different translations of technical terms (e.g. "factory reset", "scroll down" press") and are used in the instruction set provided to the user for removing the privacy information. The technical terms database allows the text included in the instruction sets presented to the user to be converted to a different language of the user's choice or based on the language to which the computing device of the user is set. Further, the technical terms allow the language used in the instruction sets would be standardized.

It is noted that in some example embodiments, all the operations performed by the privacy information removal server 114 (e.g., operations in FIGS. 3, 4, and 6) may be performed at the computing device 108, provided that the computing device has sufficient processing power without departing from a broader scope of the present disclosure.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system, comprising:
a computing device; and
at least one engine executable by the computing device, wherein the at least one engine, when executed by the computing device, is configured to cause the computing device to at least:
receive vehicle information associated with a target vehicle comprising a target in-vehicle device from which privacy information is to be removed;
determine vehicle parameters associated with the target vehicle based at least in part on the vehicle information associated with the target vehicle;
create a privacy information removal file comprising data associated with a set of candidate in-vehicle devices based at least in part on the vehicle parameters of the target vehicle, the set of candidate in-vehicle devices comprising at least one candidate in-vehicle device of vehicles that are related to the target vehicle;
transmit the privacy information removal file to a user computing device;
receive a user experience feedback associated with the set of candidate in-vehicle devices; and
record the user experience feedback.

2. The system of claim 1, wherein the computing device comprises a privacy information removal server.

3. The system of claim 1, wherein the at least one engine causes the computing device to record the user experience feedback in a database.

4. The system of claim 1, wherein the user experience feedback comprises at least one of: an image, a textual comment, or an indication that the privacy information was removed.

5. The system of claim 1, wherein the data associated with the set of candidate in-vehicle devices comprises an instruction set associated with removing privacy information from the at least one candidate in-vehicle device.

6. The system of claim 1, wherein the vehicle information comprises at least one of: a vehicle identification number (VIN), a partial vehicle identification number, a make, a model, a model year, a unit number, or a plate number of the target vehicle.

7. The system of claim 1, wherein the vehicle parameters comprise a make, a model, and a model year of the target vehicle.

8. A method, comprising:
receiving, by a computing device, vehicle information associated with a target vehicle comprising a target in-vehicle device from which privacy information is to be removed;
determining, by the computing device, vehicle parameters associated with the target vehicle based at least in part on the vehicle information associated with the target vehicle;
creating, by the computing device, a privacy information removal file comprising data associated with a set of candidate in-vehicle devices based at least in part on the vehicle parameters of the target vehicle, the set of candidate in-vehicle devices comprising at least one candidate in-vehicle device of vehicles that are related to the target vehicle;
transmitting, by the computing device, the privacy information removal file to a user computing device;
receiving, by the computing device, a user experience feedback associated with the set of candidate in-vehicle devices; and
recording, by the computing device, the user experience feedback.

9. The method of claim 8, wherein the computing device comprises a privacy information removal server.

10. The method of claim 8, wherein the user experience feedback comprises at least one of: an image, a textual comment, or an indication that the privacy information was removed.

11. The method of claim 8, wherein the data associated with the set of candidate in-vehicle devices comprises an instruction set associated with removing privacy information from the at least one candidate in-vehicle device.

12. The method of claim 8, wherein the vehicle information comprises at least one of: a vehicle identification number (VIN), a partial vehicle identification number, a make, a model, a model year, a unit number, or a plate number of the target vehicle.

13. The method of claim 8, wherein the vehicle parameters comprise a make, a model, and a model year of the target vehicle.

14. A non-transitory computer-readable medium storing a plurality of computer instructions executable by a computing device, the plurality of computer instructions being configured to cause the computing device to at least:
receive vehicle information associated with a target vehicle comprising a target in-vehicle device from which privacy information is to be removed;
determine vehicle parameters associated with the target vehicle based at least in part on the vehicle information associated with the target vehicle;
create a privacy information removal file comprising data associated with a set of candidate in-vehicle devices based at least in part on the vehicle parameters of the target vehicle, the set of candidate in-vehicle devices comprising at least one candidate in-vehicle device of vehicles that are related to the target vehicle;
transmit the privacy information removal file to a user computing device;
receive a user experience feedback associated with the set of candidate in-vehicle devices; and
record the user experience feedback.

15. The non-transitory computer readable medium of claim 14, wherein the computing device comprises a privacy information removal server.

16. The non-transitory computer readable medium of claim 14, wherein the plurality of computer instructions cause the computing device to record the user experience feedback in a database.

17. The non-transitory computer readable medium of claim 14, wherein the user experience feedback comprises at least one of: an image, a textual comment, or an indication that the privacy information was removed.

18. The non-transitory computer readable medium of claim 14, wherein the data associated with the set of candidate in-vehicle devices comprises an instruction set associated with removing privacy information from the at least one candidate in-vehicle device.

19. The non-transitory computer readable medium of claim 14, wherein the vehicle information comprises at least one of: a vehicle identification number (VIN), a partial vehicle identification number, a make, a model, a model year, a unit number, or a plate number of the target vehicle.

20. The non-transitory computer readable medium of claim 14, wherein the vehicle parameters comprise a make, a model, and a model year of the target vehicle.

\* \* \* \* \*